US012073979B2

(12) United States Patent
Ji et al.

(10) Patent No.: US 12,073,979 B2
(45) Date of Patent: Aug. 27, 2024

(54) MULTI-PHASE COUPLED INDUCTOR AND MANUFACTURING METHOD THEREOF

(71) Applicant: Delta Electronics (Shanghai) CO., LTD, Shanghai (CN)

(72) Inventors: Pengkai Ji, Shanghai (CN); Yuan Zhou, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 383 days.

(21) Appl. No.: 17/315,291

(22) Filed: May 8, 2021

(65) Prior Publication Data

US 2021/0350969 A1 Nov. 11, 2021

(30) Foreign Application Priority Data

May 9, 2020 (CN) ........................ 202010387776.9

(51) Int. Cl.
*H01F 27/25* (2006.01)
*H01F 27/255* (2006.01)
(Continued)

(52) U.S. Cl.
CPC ......... *H01F 27/255* (2013.01); *H01F 27/306* (2013.01); *H01F 41/0246* (2013.01); *H01F 41/06* (2013.01)

(58) Field of Classification Search
CPC .. H01F 27/255; H01F 27/306; H01F 41/0246; H01F 41/06; H01F 2017/002; H01F 27/263; H01F 27/28; H01F 17/04
(Continued)

(56) References Cited

U.S. PATENT DOCUMENTS 7,199,695 B1 * 4/2007 Zhou ........................ H01F 37/00 336/212
10,270,344 B2 4/2019 Huang et al.
(Continued)

FOREIGN PATENT DOCUMENTS

CN 1384968 A 12/2002
CN 103427597 A 12/2013
(Continued)

OTHER PUBLICATIONS

1st Office Action dated Nov. 30, 2022 of Chinese Application No. 202010387776.9.
(Continued)

*Primary Examiner* — Shawki S Ismail
*Assistant Examiner* — Kazi S Hossain
(74) *Attorney, Agent, or Firm* — Qinghong Xu

(57) ABSTRACT

A multi-phase coupled inductor includes at least three windings between a first plane and a second plane and a magnetic core that includes a first magnetic core, a second magnetic core and at least three magnetic core pillars, the first and second magnetic cores are respectively located at two ends of the windings, the magnetic core pillars connect the first and second magnetic cores and form at least three magnetic core units together with the first and second magnetic cores. The magnetic core units and the windings are arranged correspondingly on a one-to-one basis, the magnetic core units surround the corresponding windings and extend from the first plane to the second plane in a same direction, and projections of the at least three magnetic core units on the first plane enclose at least three enclosed areas which correspond to the windings on a one-to-one basis.

14 Claims, 18 Drawing Sheets

(51) Int. Cl.
*H01F 27/30* (2006.01)
*H01F 41/02* (2006.01)
*H01F 41/06* (2016.01)

(58) Field of Classification Search
USPC ................................................ 336/5, 221, 55
See application file for complete search history.

(56) References Cited

U.S. PATENT DOCUMENTS

| | | | | |
|---|---|---|---|---|
| 10,541,077 | B2 * | 1/2020 | Fogelberg | H01F 27/24 |
| 2002/0113679 | A1 * | 8/2002 | Takayama | H01F 30/10 336/65 |
| 2005/0024179 | A1 * | 2/2005 | Chandrasekaran | H01F 27/24 336/212 |
| 2010/0232181 | A1 * | 9/2010 | Nakahori | H01F 27/2804 336/221 |
| 2017/0250025 | A1 * | 8/2017 | Wei | H01F 41/069 |
| 2019/0221362 | A1 * | 7/2019 | Jitaru | H01F 19/04 |
| 2019/0378643 | A1 | 12/2019 | Zhou et al. | |

FOREIGN PATENT DOCUMENTS

| | | | |
|---|---|---|---|
| CN | 105784763 | A | 7/2016 |
| CN | 206650569 | U | 11/2017 |
| CN | 207052414 | U | 2/2018 |
| CN | 108022731 | A | 5/2018 |
| CN | 108022917 | A | 5/2018 |
| CN | 108364752 | A | 8/2018 |
| CN | 208478093 | U | 2/2019 |
| CN | 109525099 | A | 3/2019 |
| CN | 108022917 | B | 11/2019 |
| CN | 110970210 | A | 4/2020 |
| JP | 2000114074 | A | 4/2000 |
| JP | 2013038371 | A | 2/2013 |
| JP | 2019087649 | A | 6/2019 |
| JP | 2020047907 | A | 3/2020 |

OTHER PUBLICATIONS

1st Office Action dated Nov. 30, 2022 of Chinese Application No. 202010387760.8.

Huang Kai, Zhang Shen, Bei Lulu, "Novel wideband bandpress filter-based on anti-coupled line," Electronic Components and Materials, 2015(4), pp. 39-42.

The 1st Office Action dated Feb. 24, 2022 for Indian patent application No. 202114020915.

The 1st Office Action dated Apr. 18, 2022 for Indian patent application No. 202114020881.

Notice of Allowance dated Jul. 11, 2024 for U.S. Appl. No. 17/225,068.

Yan Dong et al., Twisted core coupled inductors for microprocessor voltage regulators, IEEE Transactions on Power Electronics, vol. 23, No. 5, published on Sep. 2008.

* cited by examiner

MULTI-PHASE COUPLED INDUCTOR AND MANUFACTURING METHOD THEREOF

CROSS REFERENCE

This application is based upon and claims priority to Chinese Patent Application No. 202010387776.9, filed on May 9, 2020, the disclosure of which is incorporated herein by reference in its entirety.

TECHNICAL FIELD

The present disclosure relates to the field of electronic power technologies, and in particular to a multi-phase coupled inductor and a manufacturing method thereof.

BACKGROUND

At present, a market size of clouds (data centers) and terminals (mobile phones, iPads, etc.) is increasingly larger, and is still growing rapidly. At the same time, however, it is also facing many challenges. For example, with more and more functions of various smart ICs, the power consumption is increasing, there are more and more devices on the motherboard, and power modules are required to have higher power density, or a single power module is required to have a greater current output capacity. In addition, with the improvement of the computing power of the smart ICs, the requirements for dynamic performance of the power modules are also higher. When both high efficiency and high dynamic performance are pursued, reverse coupling between multi-phase circuits is a good solution. A reverse coupled inductor is one of the keys for realizing the multi-phase reverse coupling.

The reverse coupled inductor can realize separation of dynamic inductance and static inductance. The same inductor can have both smaller inductance in a dynamic state, improving a response speed, and increased inductance in a static state, achieving a smaller ripple current, and thus combines the characteristics of a good dynamic response and a small static ripple. In addition, a volume of a magnetic core can be reduced by magnetic integration and magnetic flux reverse offset. Multi-phase reverse coupled inductors can further improve the efficiency of the power modules, reduce the size of the power modules and improve the dynamic performance of the power modules, and can further reduce the number of output capacitors of the power modules. The existing multi-phase reverse coupled inductors are not balanced in the coupling between phases, that is, the coupling is the strongest between adjacent phases and then gradually weakens, a self-inductance difference between the phases is large, and the asymmetry of the coupling between multiple phases will significantly affect the efficiency and output current capability of the power modules, a structure of windings in the existing multi-phase reverse coupled inductors is generally complicated, or the magnetic structure is complex, which is generally a three-dimensional structure and is asymmetrical, and the magnetic components are easily deformed in the process of forming, sintering or hot pressing due to shrinkage and other factors, which makes it complicated to control the forming process of the magnetic components, resulting in a low yield, a high cost, a poor precision of the magnetic components and a poor consistency of the inductance.

SUMMARY

According to a first aspect of the present disclosure, a multi-phase coupled inductor is provided, including at least three windings arranged in an array between a first plane and a second plane, and a magnetic core, wherein the windings include linear winding portions between the first plane and the second plane, the first plane and the second plane are parallel to each other, the magnetic core includes a first magnetic core, a second magnetic core, and at least three magnetic core pillars, wherein the first magnetic core and the second magnetic core are respectively located at two ends of the windings, the magnetic core pillars are connected with the first magnetic core and the second magnetic core, the magnetic core pillars, the first magnetic core, and the second magnetic core form at least three magnetic core units, the magnetic core units and the windings are arranged on a one-to-one basis, and the at least three magnetic core units surround the corresponding windings and extend from the first plane to the second plane in a same direction, wherein projections of the at least three magnetic core units on the first plane perpendicular to the windings form at least three enclosed areas corresponding to the windings on a one-to-one basis.

According to a second aspect of the present disclosure, there is provided a manufacturing method of a multi-phase coupled inductor, including:

- providing at least three windings arranged in an array between a first plane and a second plane, wherein the windings include linear winding portions between the first plane and the second plane, and the first plane and the second plane are parallel to each other; and
- providing a magnetic core including a first magnetic core, a second magnetic core, and at least three magnetic core pillars, wherein the first magnetic core and the second magnetic core are respectively located at two ends of the windings, the magnetic core pillars are connected with the first magnetic core and the second magnetic core, the first magnetic core, the second magnetic core, and the magnetic core pillars form at least three magnetic core units, the magnetic core units and the windings are arranged on a one-to-one basis, and the at least three magnetic core units surround the corresponding windings and extend from the first plane to the second plane in a same direction, and wherein projections of the at least three magnetic core units on the first plane perpendicular to the windings form at least three enclosed areas which correspond to the windings on a one-to-one basis.

BRIEF DESCRIPTION OF THE DRAWINGS

Various objectives, features, and advantages of the present disclosure will become more apparent in consideration of the following detailed description of the embodiments of the present disclosure in conjunction with the accompanying drawings. The drawings are merely exemplary illustrations of the present disclosure and are not necessarily drawn to scale. Same reference numerals refer to same or similar parts throughout the drawings in which.

Figure 1:
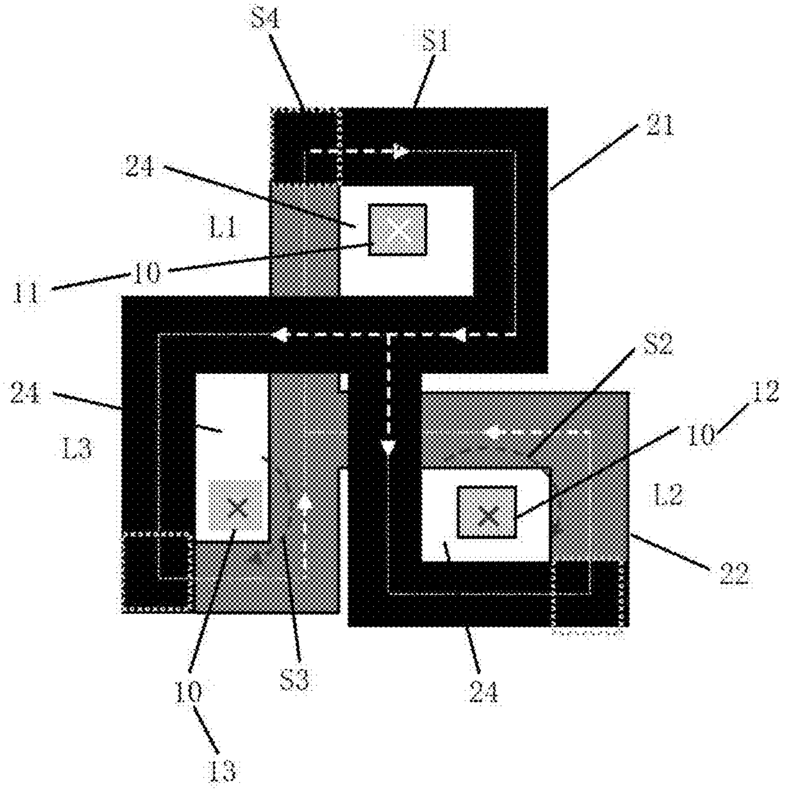
FIG. 1 is a schematic structural diagram of a multi-phase reverse coupled inductor in a first perspective of view according to a first exemplary embodiment.

The reference numerals are explained as follows:

1. Multi-Phase Coupled Inductor; 10. Winding; 11. First Winding; 12. Second Winding; 13. Third Winding; 14. Fourth Winding; 20. Magnetic Core; 21. First Magnetic Core; 211. First Connecting End; 22. Second Magnetic Core; 221. Second Connecting End; 23. Magnetic Core Pillar; 24. Enclosed Area; 25. Conductive Plate; 26. Gap Area; 27. Decoupling Magnetic Pillar; 28. Horizontal Winding; 281. First Horizontal Winding; 282. Second Horizontal Winding; 29. Air Gap; 30. Isolation Plate; 31. First Mounting Hole; 32. Gap; 33. Mold Body; 331. Lower Punch; 332. Upper Punch; 34. Powder Core Material; 35. Through Hole; 36. First Magnetic Core Layer; 37. Workbench; 38. First Isolation Layer; 39. Filling Hole; 40. Second Magnetic Core Layer; 41. Second Isolation Layer; 42. Conductive Via; 43. First Connecting Portion; 44. Second Connecting Portion; 47. Cutting Line.

DETAILED DESCRIPTION

Typical embodiments embodying features and advantages of the present disclosure will be described in detail in the following description. It should be understood that the present disclosure can have various changes in different embodiments, which do not depart from the scope of the present disclosure, and the description and drawings are essentially for illustrative purposes, rather than limiting the present disclosure.

In the description of different exemplary embodiments of the present disclosure, reference is made to the accompanying drawings, which form a part of the present disclosure and show different exemplary structures, systems, and steps that can implement various aspects of the present disclosure by way of example. It should be understood that other specific solutions of components, structures, exemplary devices, systems, and steps may be used, and structural and functional modifications may be made without departing from the scope of the present disclosure. Moreover, although the terms “above”, “between”, “within”, etc. may be used in this specification to describe different exemplary features and elements of the present disclosure, these terms are used herein for convenience only, for example, in the directions of the examples in the drawings. Nothing in this specification should be understood as requiring specific three-dimensional directions of the structure to fall within the scope of the present disclosure.

According to a first aspect of the present disclosure, a multi-phase coupled inductor is provided. As shown in FIGS. 1-27, the multi-phase coupled inductor includes a winding 10 and a magnetic core 20. There are at least three windings 10, and the at least three windings 10 are arranged in an array between a first plane and a second plane, the windings 10 include linear winding portions between the first plane and the second plane, and the first plane and the second plane are parallel to each other. The magnetic core 20 includes a first magnetic core 21, a second magnetic core 22, and magnetic core pillars 23. The first magnetic core 21 and the second magnetic core 22 are respectively located at two ends of the windings 10, and the magnetic core pillars 23 connect the first magnetic core 21 and the second magnetic core 22. There are at least three magnetic core pillars 23 which form at least three magnetic core units together with the first magnetic core 21 and the second magnetic core 22. The magnetic core units and the windings 10 are arranged on a one-to-one basis. The at least three magnetic core units surround the corresponding windings 10 and extend from the first plane to the second plane in a same direction, and projections of the at least three magnetic core units on the first plane perpendicular to the windings 10 enclose at least three enclosed areas 24 which correspond to the windings on a one-to-one basis.

The multi-phase coupled inductor of the present disclosure may be a three-phase coupled inductor or any coupled inductor of more than three phases. The windings 10 in the multi-phase coupled inductor are arranged in an array, that is, the windings 10 are arranged in multiple rows and multiple columns, instead of all being arranged along a straight line, which can shorten the magnetic circuit between the inductors and make the coupling strength between the inductors of the phases and the inductance thereof more balanced and consistent with each other.

In one embodiment, the windings 10 are all linear windings, and each winding 10 is a single-turn winding and is vertically arranged, so that a path of the winding 10 may be short, which is suitable for stacked power module and beneficial to improve the efficiency of the power module and heat dissipation in the vertical direction. The structure of the windings 10 and the magnetic cores 20 is simple and compact, and has a smaller footprint. The single-turn winding 10 may be formed by a single conductive pillar, or by a plurality of conductive pillars connected in parallel, which can increase the current capacity and simplify the production.

Figure 2:
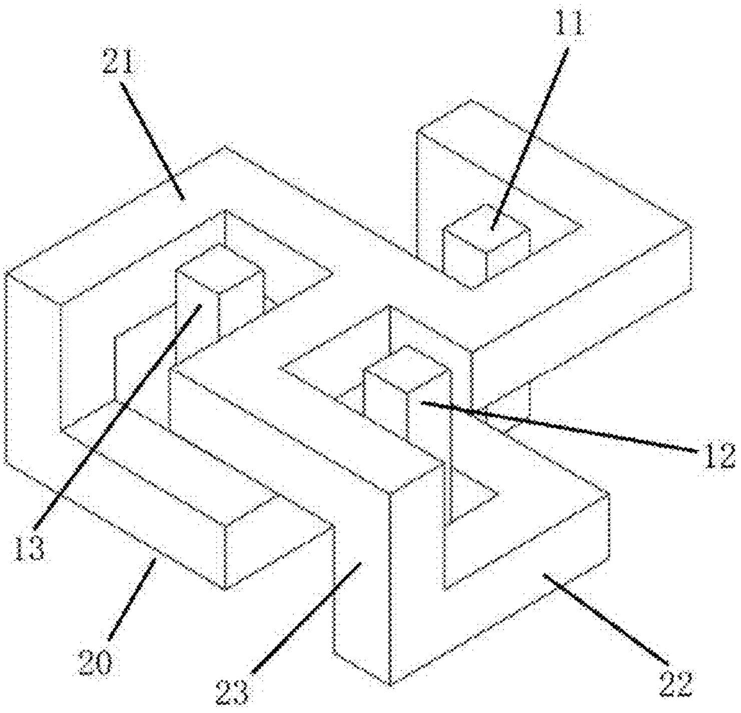
FIG. 2 is a schematic structural diagram of the multi-phase reverse coupled inductor in a second perspective of view according to the first exemplary embodiment.

In an embodiment, as shown in FIGS. 1 to 2, the multi-phase coupled inductor is a three-phase coupled inductor. The three-phase coupled inductor includes a magnetic core 20 and three windings 10. The magnetic core 20 includes a first magnetic core 21, a second magnetic core 22 and three magnetic core pillars 23. The first magnetic core 21 is located on an upper first plane, and the second magnetic core 22 is located on a lower second plane. The windings 10 extend from the first plane to the second plane in a vertical direction. S4 indicates that the magnetic core pillars 23 are provided in a direction perpendicular to the page to connect the first magnetic core 21 and the second magnetic core 22. Both the first magnetic core 21 and the second magnetic core 22 include a connecting portion in the middle and three branches extending outward from the connecting portion. Each of the three branches of the first magnetic core 21 and each of the three branches of the second magnetic core 22 are correspondingly connected through the magnetic core pillars 23 on a one-to-one basis. The three magnetic core pillars 23 and the first magnetic core 21 and the second magnetic core 22 form three magnetic core units. The projections of the three magnetic core units on the first plane perpendicular to the windings 10 enclose three enclosed areas 24, and the three magnetic core units are arranged correspondingly to the three windings 10 on a one-to-one basis. In one embodiment, the three magnetic core units surround the corresponding windings 10 and extend in the same direction from the first plane to the second plane around. For example, in each of the magnetic core units, the corresponding winding TO is surrounded in a counterclockwise direction from the connecting portion of the first magnetic core 21 to the connecting portion of the second magnetic core 22 through the branch of the first magnetic core 21, the magnetic core pillar 23 and the branch of the second magnetic core 22 in this order. The first magnetic core 21, the second magnetic core 22 and the magnetic core pillars 23 may be integrally formed to improve a forming efficiency of the multi-phase coupled inductor and simplify an installation process of components of the multi-phase coupled inductor. The three windings 10 includes a first winding 11, a second winding 12, and a third winding 13, and the three windings 10 together with the magnetic core 20 form three inductors that include a first inductor L1, a second inductor L2, and a third inductor L3. The three windings 10 are arranged in a triangle shape, that is, a minimum envelope surface of the three windings 10 is of the triangle shape. For example, the three windings 10 may be arranged in an equilateral triangle shape. As such, connection paths between the three magnetic core units surrounding the three windings 10 are short. For example, the magnetic core units surrounding respective windings 10 can be directly interconnected with each other, and lengths of the connection paths are the same. Accordingly, the coupling between the inductors of the three phases is more balanced and consistent, and the magnetic loss is small. Terminals can be provided at upper and lower ends of the windings 10 for electrical connection with external circuits. It is also possible to form each of the windings by a plurality of conductors connected in parallel.

In some embodiments, currents flow through the at least three windings 10 in the same direction, and magnetic flux generated by the current flowing through any one of the windings 10 in the corresponding magnetic core unit is in a direction opposite to that of the magnetic flux generated by the current flowing through any other of the windings 10 in that magnetic core unit. In this way, the reverse coupling can be realized between the inductors of the multiple phases. As shown in FIG. 1, the directions of the currents flowing through the three windings 10 are all the same in the embodiment. For example, when the currents in the three windings 10 all flow from top to bottom, the current direction is represented by a symbol x, and the first winding 11 of the inductor L1 generates the magnetic flux as shown by a dashed line S1, the magnetic flux S1 is in a clockwise direction in the magnetic core unit corresponding to the first winding 11, and is in a counterclockwise direction in other core units. The second winding 12 of the inductor L2 generates the magnetic flux as shown by the dashed line S2. The magnetic flux S2 is in the clockwise direction in the magnetic core unit corresponding to the second winding 12, and is in the counterclockwise direction in the other magnetic core units. The third winding 13 of the inductor L3 generates the magnetic flux as shown by the dashed line S3, and the magnetic flux S3 is in the clockwise direction in the magnetic core unit corresponding to the third winding 13 and is in the counterclockwise direction in the other magnetic core units. When the magnetic flux S1 generated by the first winding 11 is transmitted to the magnetic core unit surrounding the second winding 12, the direction of the magnetic flux S1 is opposite to the direction of the magnetic flux S2 generated by the second winding 12, and when the magnetic flux S1 generated by the first winding 11 is transmitted to the magnetic core unit surrounding the third winding 13, the direction of the magnetic flux S1 is opposite to the direction of the magnetic flux S3 generated by the third winding 13. The reverse coupling can be realized between any two of the inductors L1, L2, and L3.

Figure 3:
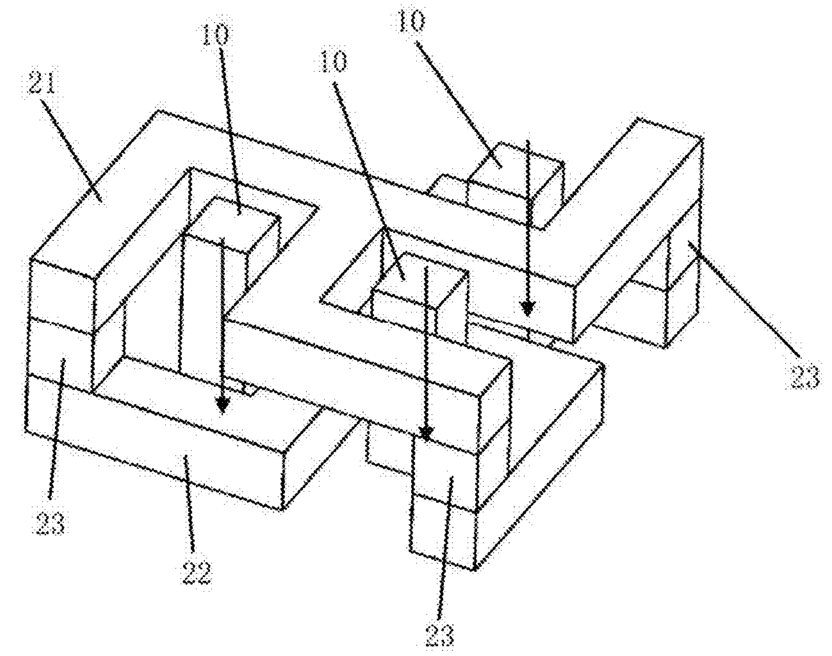
FIG. 3 is a schematic structural diagram of a multi-phase reverse coupled inductor according to a second exemplary embodiment.
Figure 4:
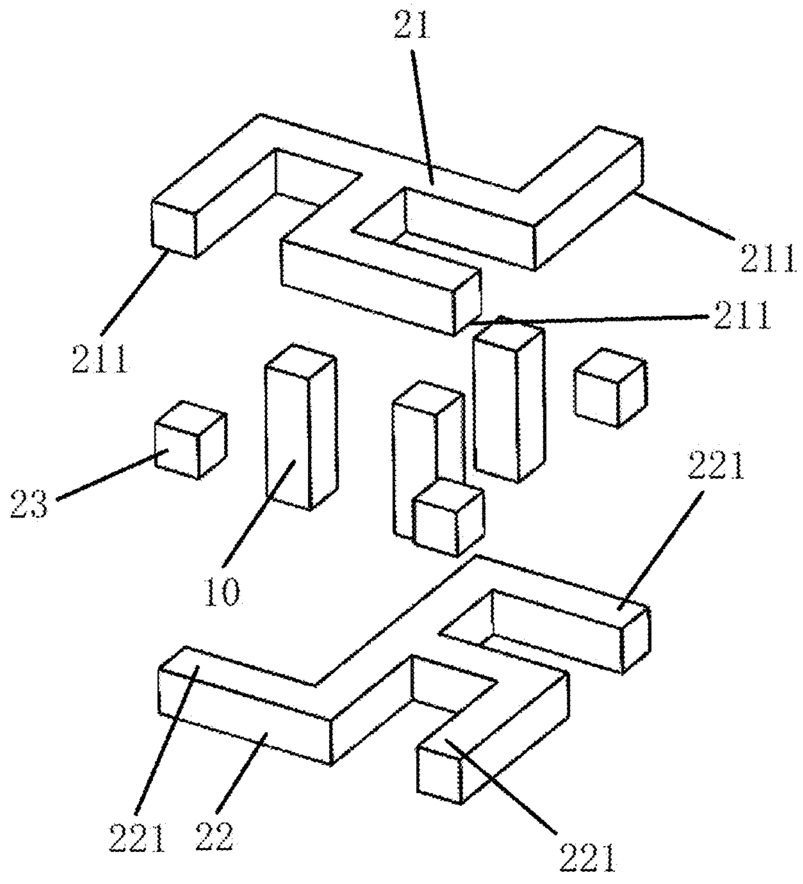
FIG. 4 is a schematic diagram of a decomposed structure of the multi-phase reverse coupled inductor according to the second exemplary embodiment.

In some embodiments, the first magnetic core 21 may include at least three first connecting ends 211, the second magnetic core 22 may include at least three second connecting ends 221, and the magnetic core pillars 23 are respectively connected between the corresponding first connecting ends 211 and second connecting ends 221. As shown in FIGS. 3 to 4, the first magnetic core 21 includes three first connecting ends 211, and the second magnetic core 22 includes three second connecting ends 221. The first connecting ends 211 are located at the ends of the branches of the first magnetic core 21, and the second connecting ends 221 are located at the ends of the branches of the second magnetic core 22, and the magnetic core pillars 23 are connected between the first connecting ends 211 and the second connecting ends 221. The first magnetic core 21, the second magnetic core 22, and the magnetic core pillars 23 can be formed separately to reduce the difficulty of manufacturing the magnetic core, and to provide a replaceability of each component so as to avoid the situation that the whole inductor is scrapped due to the problem occurring in one of the components. The three windings 10 may be arranged in a right triangle array, and the first magnetic core 21 and the second magnetic core 22 may be components with the same shape. One of the first magnetic core 21 and the second magnetic core 22 is flipped and arranged to correspond to the other one as shown, the magnetic core pillars 23 are arranged between the first magnetic core 21 and the second magnetic core 22, and the multi-phase coupled inductor can be formed with the vertical windings 10 inserted. The inductor has a simple and compact structure, and each magnetic core component has a planar structure and a symmetrical shape, which is beneficial to reduce the deformation of the magnetic core 20 during the process of forming, sintering or hot pressing, making it easier to manufacture, thereby improving the precision and yield of the inductor. Three indicating lines from top to bottom in FIG. 3 indicate that the direction of currents flowing through the three windings 10 is from top to bottom.

Figure 5:
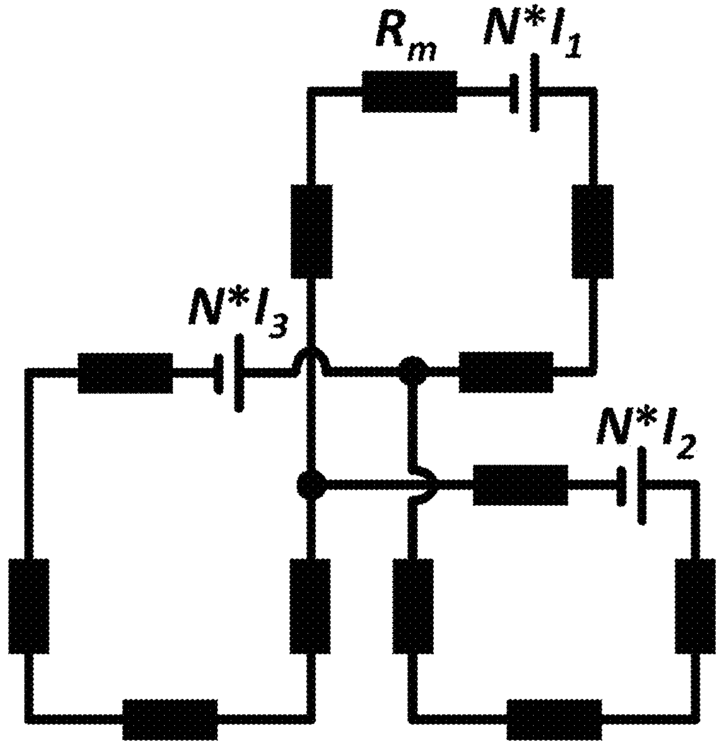
FIG. 5 is a schematic diagram showing a magnetic circuit model of a three-phase coupled inductor according to an exemplary embodiment.
Figure 6:
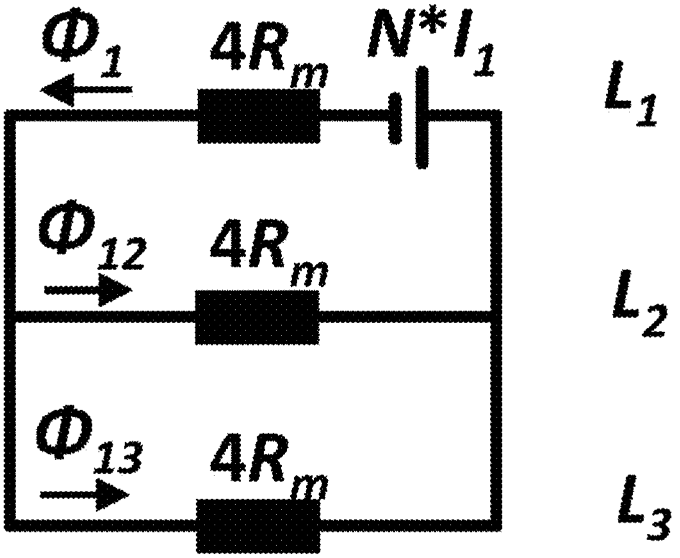
FIG. 6 is a schematic diagram showing a simplified magnetic circuit model of a three-phase coupled inductor according to an exemplary embodiment.
Figure 7:
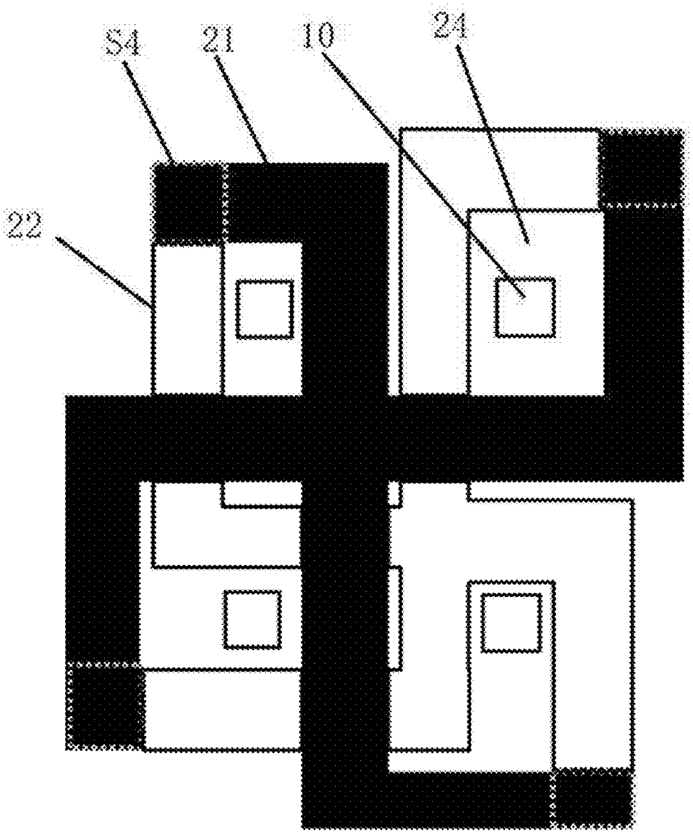
FIG. 7 is a schematic structural diagram of a multi-phase reverse coupled inductor in a first perspective of view according to a third exemplary embodiment.

FIG. 5 is a schematic diagram illustrating a magnetic circuit of the three-phase coupled inductor in FIGS. 1 to 4. In this simplified model, it assumes that each magnetic core unit is divided into four sections, and each section of the magnetic core unit surrounding the corresponding winding 10 has a same length and a same area. A magnetic reluctance of each section is represented as Rm, magnetomotive forces of the magnetic core units are N*I1, N*12 and N*I3, and the winding corresponding to each magnetic core unit is in a single-turn, that is, N=1. Assuming that the currents I1, I2, and I3 are equal to each other, the magnetomotive force of each magnetic core unit may be the same. It is also assumed that a permeability of the magnetic core 20 is much greater than that of air without considering scattered magnetism in the air or air gaps on the path of each magnetic core unit, or the air gaps on each magnetic core unit is assumed to be the same. The model shown in FIG. 5 can be further simplified into a magnetic reluctance model shown in FIG. 6. Take the inductor L1 in the three-phase reverse coupled inductor as an example, assuming that the magnetic flux generated by the magnetomotive force N*I1 for overcoming its magnetic reluctance Rm is Φ1 in FIG. 6, the magnetic flux Φ1 is transmitted in parallel to the inductors L2 and L3, that is, Φ12=0.5*Φ1 and Φ13=0.5*Φ1, wherein Φ12 refers to a component of the magnetic flux generated by the inductor L1 that is transmitted to the magnetic core unit corresponding to the inductor L2, and Φ13 refers to a component of the magnetic flux generated by the inductor L1 that is transmitted to the magnetic core unit corresponding to the inductor L3. The analysis shows that the magnetic circuit has a good symmetry, the magnetic flux of each magnetic circuit is balanced and consistent, the magnetic flux is more balanced between the inductors of the respective phases, and the coupling consistency between the inductors of the respective phases is also better.

In some embodiments, at least one of the first magnetic core 21 and the second magnetic core 22 may be formed integrally with the magnetic core pillars 23 to improve the forming efficiency of the inductor structure and simplify the installation process of the various components of the inductor. There may be at least four windings 10, and the at least four windings 10 are arranged in an annular array or a rectangular array. The windings 10 may have a polygonal prism shape, for example, a square prism shape.

As shown in FIGS. 7 to 12, the multi-phase coupled inductor is a four-phase coupled inductor. The four-phase coupled inductor includes a magnetic core 20 and four windings 10. The magnetic core 20 includes a first magnetic core 21, a second magnetic core 22, and magnetic core pillars 23. The first magnetic core 21 and the second magnetic core 22 each include a connecting portion located in the middle and four branches extending outward from the connecting portion. The four branches of the first magnetic core 21 and the four branches of the second magnetic core 22 are connected correspondingly through the magnetic core pillars 23 on a one-to-one basis. The four windings 10 are arranged in a 2×2 rectangular array, and the magnetic circuit of the inductor of each phase is consistent with each other, which can make the coupling between the inductors of the phases more balanced.

Figure 8:
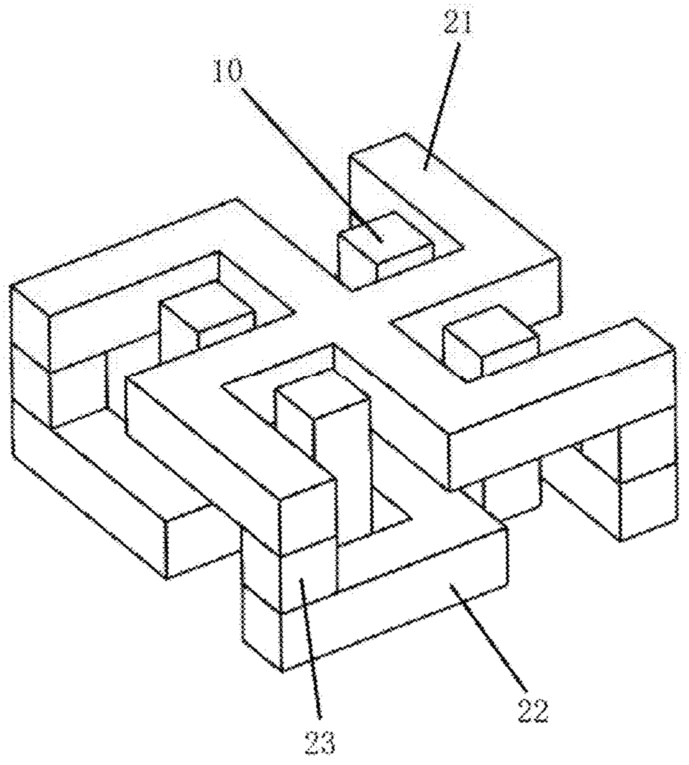
FIG. 8 is a schematic structural diagram of a multi-phase reverse coupled inductor in a second perspective of view according to the third exemplary embodiment.
Figure 9:
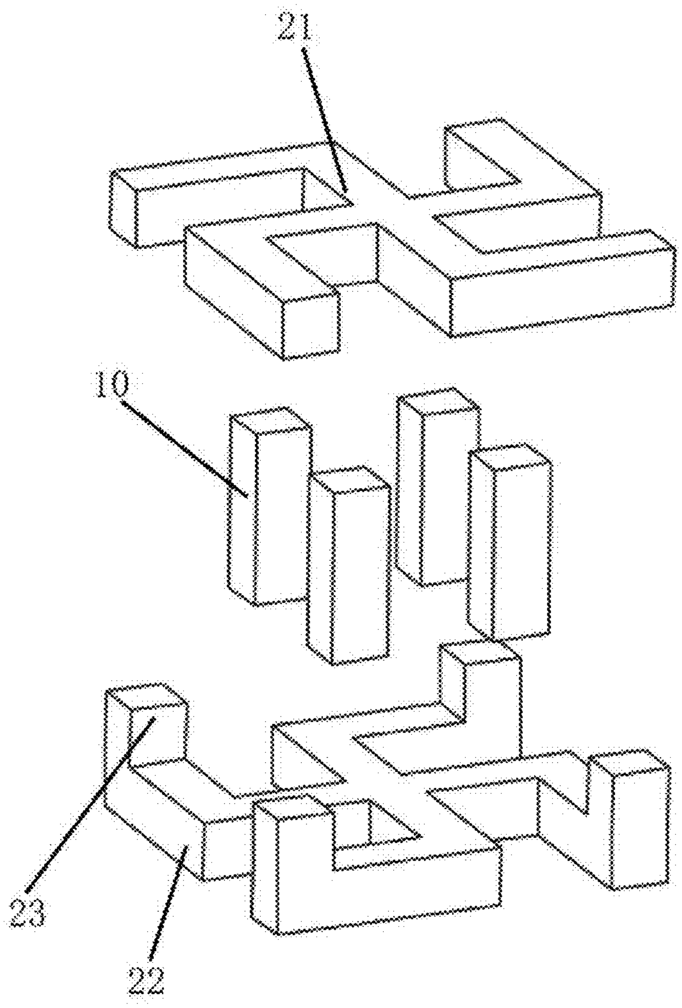
FIG. 9 is a schematic diagram of a decomposed structure of a multi-phase reverse coupled inductor according to a fourth exemplary embodiment.
Figure 10:
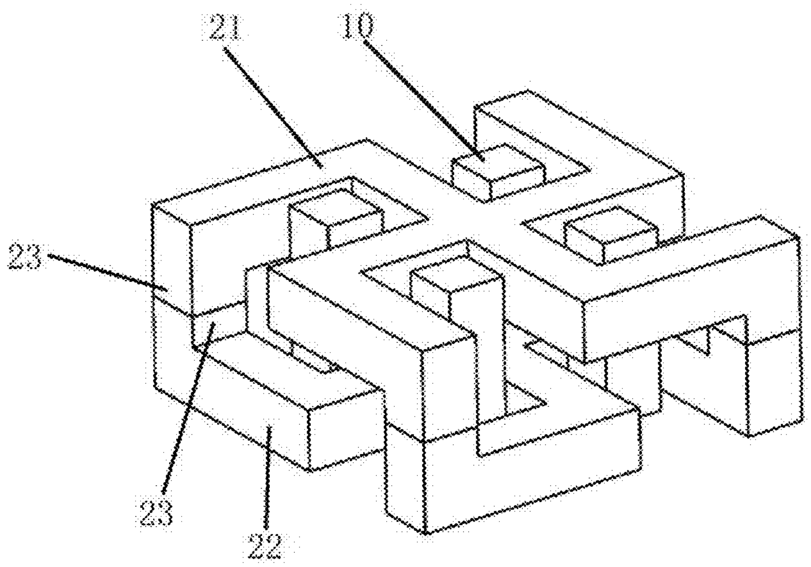
FIG. 10 is a schematic structural diagram of a multi-phase reverse coupled inductor according to a fifth exemplary embodiment.
Figure 11:
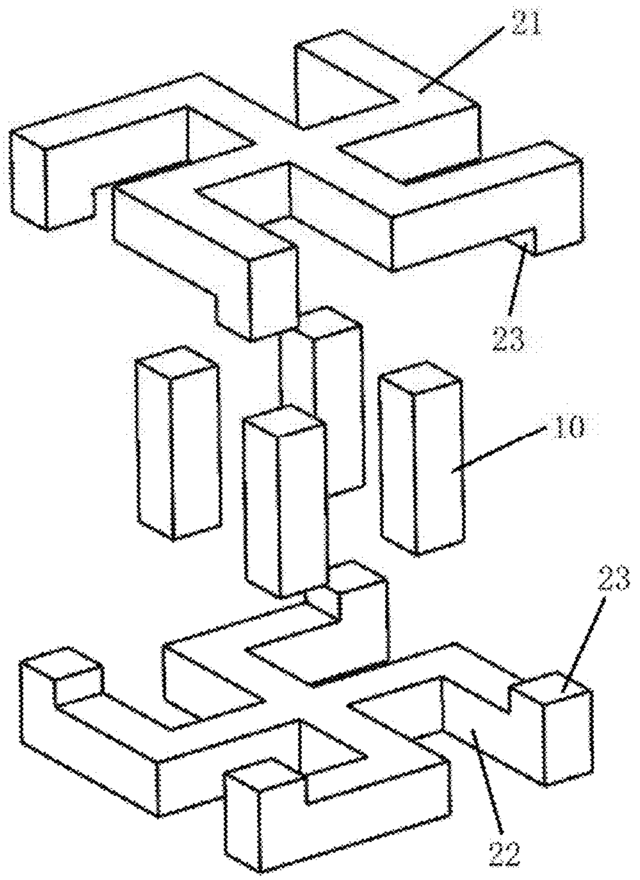
FIG. 11 is a schematic diagram showing a decomposed structure of a multi-phase reverse coupled inductor according to the fifth exemplary embodiment.
Figure 12:
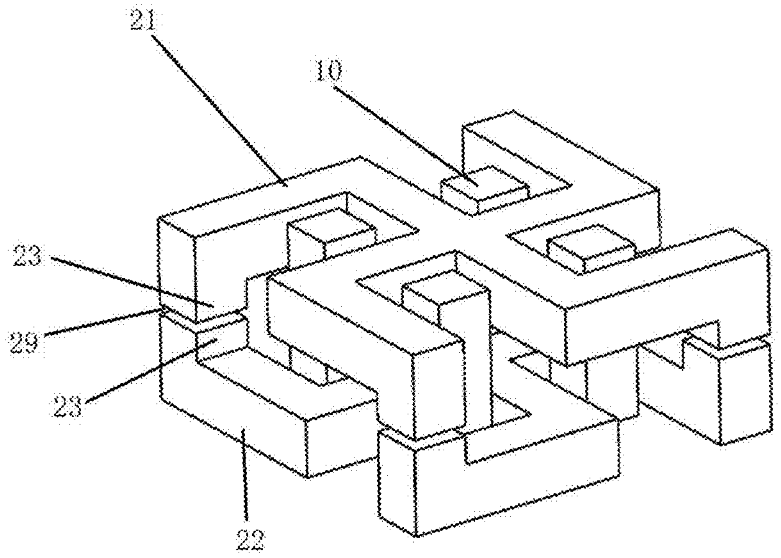
FIG. 12 is a schematic structural diagram of a multi-phase reverse coupled inductor according to a sixth exemplary embodiment.

As shown in FIG. 8, the first magnetic core 21 and the second magnetic core 22 may be components with the same shape, and the first magnetic core 21 and the second magnetic core 22 are connected through four magnetic core pillars 23. That is, only one mold is required to accomplish the manufacture of the first magnetic core 21 and the second magnetic core 22, and the magnetic core pillars 23 can be manufactured by another mold. Both the first magnetic core 21 and the second magnetic core 22 can have a symmetrical structure, such as a center symmetrical structure, which is more conducive to reducing the deformation of the magnetic core during the forming process, and each component of the magnetic core has a planar structure, making the manufacture easier and more accurate. In FIG. 8, the first magnetic core 21, the second magnetic core 22 and the magnetic core pillars 23 are separately formed in the embodiment. In FIG. 9, the first magnetic core 21 is formed separately, and the second magnetic core 22 and the magnetic core pillars 23 are integrally formed, which can reduce the number of magnetic core components and simplify the assembling process. In some other embodiments, the second magnetic core 22 may be formed separately, and the first magnetic core 21 and the magnetic core pillar 23 are integrally formed. In FIGS. 10 and 11, the magnetic core 20 includes four pairs of magnetic core pillars 23, the magnetic core pillars 23 are arranged in pairs, and two magnetic core pillars 23 in each pair are arranged on the first magnetic core 21 and the second magnetic core 22, respectively. One of two magnetic core pillars 23 in the pair is formed integrally with the first magnetic core 21, and the other one of two magnetic core pillars 23 in the pair is formed integrally with the second magnetic core 22. The first magnetic core 21 and the second magnetic core 22 are of the same shape, the two magnetic core pillars 23 in the pair are of the same shape, and an upper part in which the first magnetic core 21 is formed integrally with four of the magnetic core pillars 23 has a same shape as that of a lower part in which the second magnetic core 22 is formed integrally with the other four magnetic core pillars 23. Accordingly, in one embodiment, the number and types of magnetic core components can be reduced, and all parts of the magnetic core 20 can be manufactured by only one set of molds, which can greatly reduce the cost. Also, the magnetic core 20 can be formed by flipping one of them and assembling it with the other one correspondingly. In FIG. 12, an air gap 29 is provided on the magnetic core pillar 23 between the first magnetic core 21 and the second magnetic core 22, for example, the air gap 29 is provided between two opposite magnetic core pillars 23. The air gap 29 can be used to adjust inductance or a saturation current of the coupled inductor. In practical applications, glass bead glue in corresponding specifications can be provided at the air gap 29 to achieve a required size of the gap and realize connection between the upper and lower magnetic core pillars 23.

Figure 13:
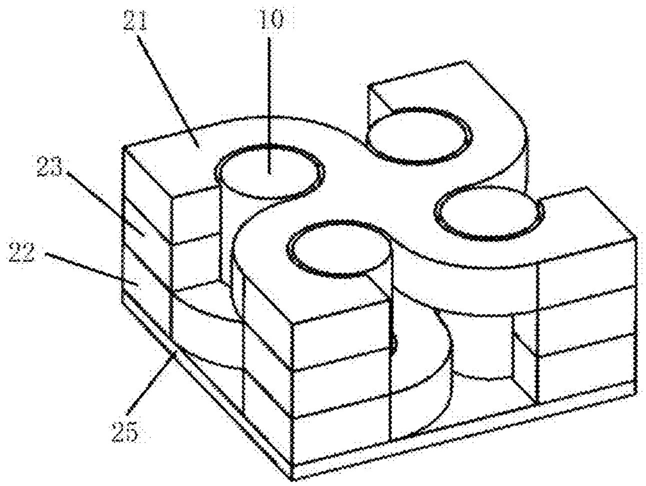
FIG. 13 is a schematic structural diagram of a multi-phase reverse coupled inductor according to a seventh exemplary embodiment.
Figure 14:
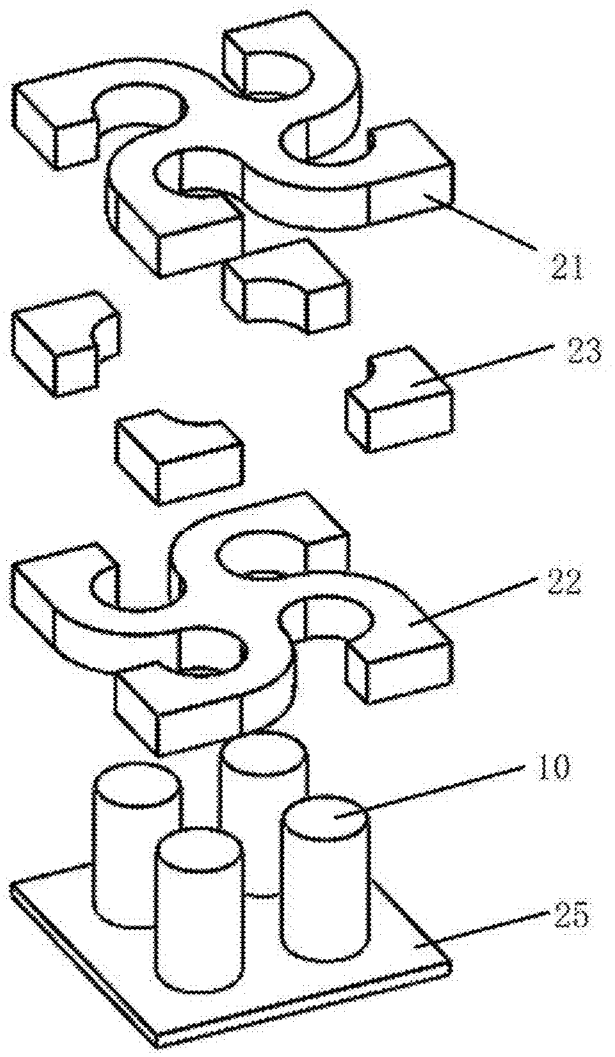
FIG. 14 is a schematic diagram showing a decomposed structure of a multi-phase reverse coupled inductor according to the seventh exemplary embodiment.

In some embodiments, the multi-phase coupled inductor may further include a conductive plate 25, and the at least three windings 10 are connected to the conductive plate 25. As shown in FIGS. 13 and 14, the lower ends of the four windings 10 are connected to the conductive plate 25. The conductive plate 25 can be used as a common output terminal of the entire multi-phase coupled inductor to facilitate electrical connection between the multi-phase coupled inductor and other electronic devices, which is convenient for various practical applications. The windings 10 have a cylindrical shape. Compared with the polygonal prismatic windings 10 in FIGS. 7 to 12, the cylindrical windings 10 are easier to manufacture. The corresponding parts of the first magnetic core 21 and the second magnetic core 22 surrounding the cylindrical windings 10 can be set in a circular arc shape, and the corresponding parts of the magnetic core pillars 23 surrounding the cylindrical windings 10 can also be set in a circular arc shape, that is, a magnetic window of the magnetic core 20 has a cylindrical shape, which can shorten the length of the magnetic circuit, reduce local concentration of magnetic flux, and reduce the magnetic core loss.

In some embodiments, as shown in FIGS. 15 to 18, an outer side of the magnetic core 20 may also be set in the circular arc shape on the basis of the embodiments shown in FIGS. 13 and 14. The outer peripheral surfaces of the first magnetic core 21, the second magnetic core 22 and the magnetic core pillars 23 are set in the circular arc shape, which can further improve the symmetry, compactness and manufacturability of the structure.

Figure 15:
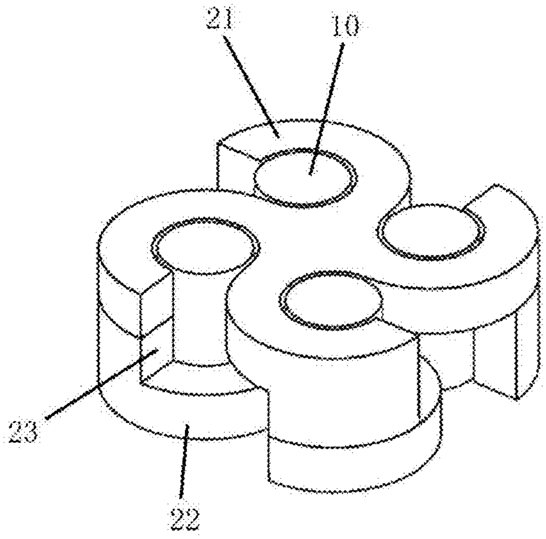
FIG. 15 is a schematic structural diagram of a multi-phase reverse coupled inductor according to an eighth exemplary embodiment.
Figure 16:
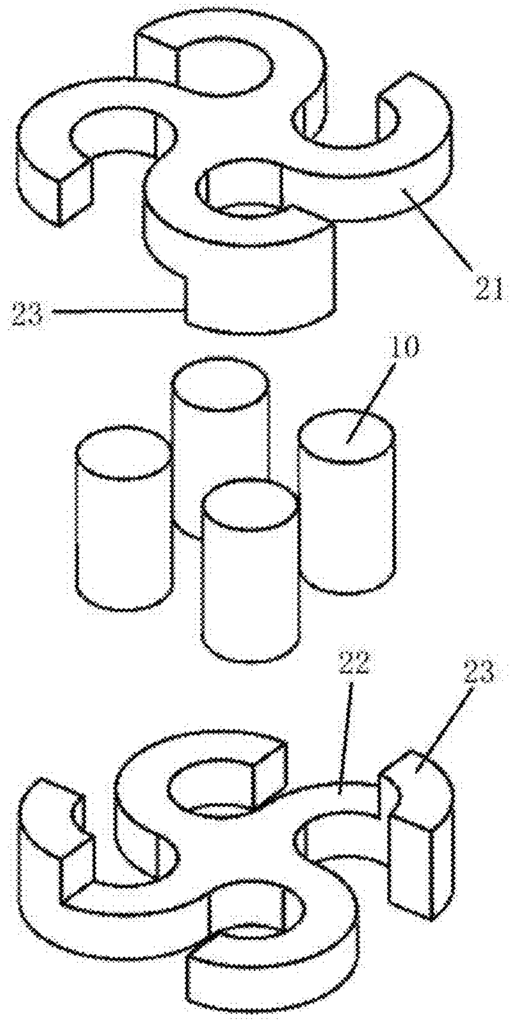
FIG. 16 is a schematic diagram showing a decomposed structure of a multi-phase reverse coupled inductor according to the eighth exemplary embodiment.

As shown in FIGS. 15 and 16, the magnetic core 20 includes four magnetic core pillars 23. The four first connecting ends of the first magnetic core 21 and the four second connecting ends of the second magnetic core 22 are provided with protrusion structures at intervals as the magnetic core pillars 23. The upper part in which the first magnetic core 21 and two of the magnetic core pillars 23 are integrally formed has the same shape as the lower part in which the second magnetic core 22 and the other two magnetic core pillars 23 are integrally formed, and the magnetic core 20 can be formed by only flipping one part and assembling it with the other part correspondingly.

Figure 17:
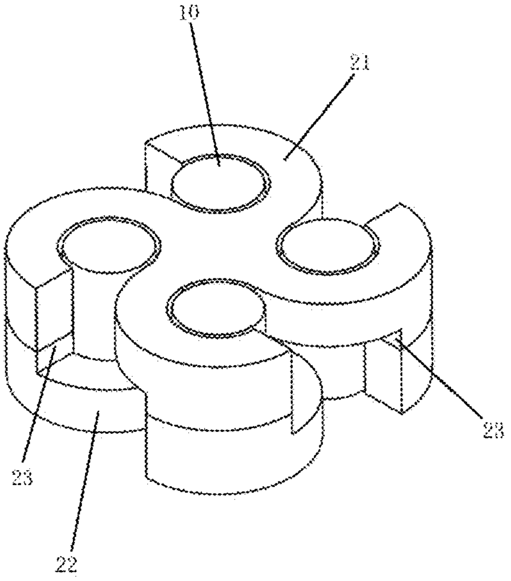
FIG. 17 is a schematic structural diagram of a multi-phase reverse coupled inductor according to a ninth exemplary embodiment.
Figure 18:
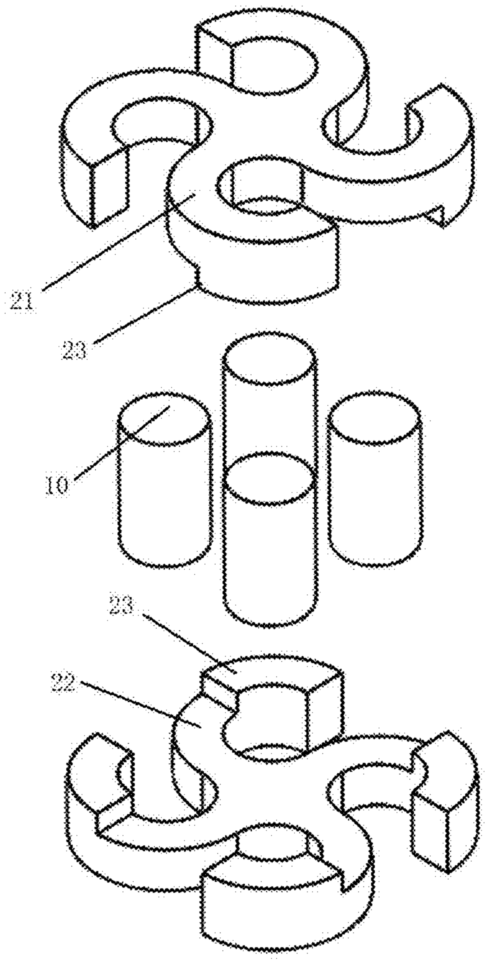
FIG. 18 is a schematic diagram showing a decomposed structure of a multi-phase reverse coupled inductor according to the ninth exemplary embodiment.

As shown in FIGS. 17 and 18, the magnetic core 20 includes four pairs of magnetic core pillars 23, and each of the four first connecting ends of the first magnetic core 21 and the four second connecting ends of the second magnetic core 22 is provided with a protrusion structure as the magnetic core pillar 23. The upper part in which the first magnetic core 21 and the four magnetic core pillars 23 located at the ends thereof are integrally formed has the same shape as the lower part in which the second magnetic core 22 and the four core pillars 23 located at the ends thereof are integrally formed. The multi-phase coupled inductors shown in FIGS. 15 to 18 can reduce the number and types of the magnetic core components, and the magnetic core 20 can be manufacture by only one set of molds, which can greatly reduce the cost. An air gap 29 can also be provided on the magnetic core pillar 23 between the first magnetic core 21 and the second magnetic core 22 to adjust the inductance and saturation current of the inductor of each phase.

Figure 19:
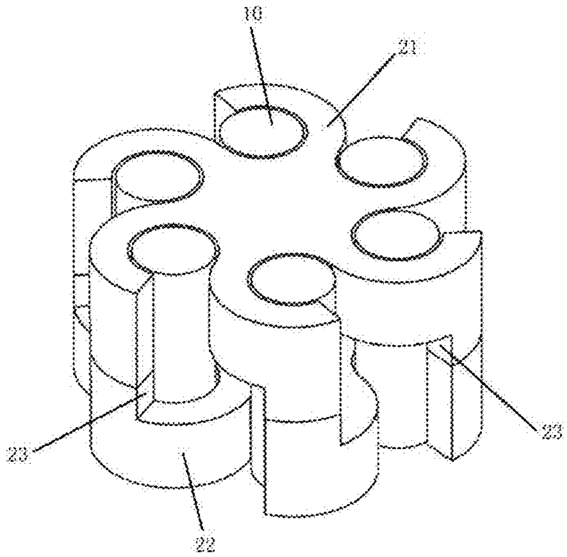
FIG. 19 is a schematic structural diagram of a multi-phase reverse coupled inductor according to a tenth exemplary embodiment.
Figure 20:
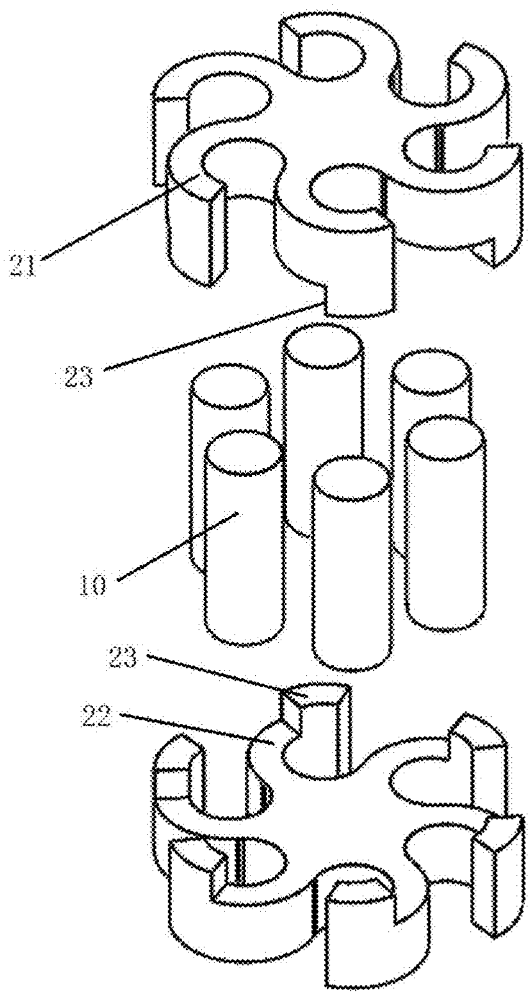
FIG. 20 is a schematic diagram showing a decomposed structure of a multi-phase reverse coupled inductor according to the tenth exemplary embodiment.

In an embodiment, as shown in FIGS. 19 and 20, the multi-phase coupled inductor is a six-phase coupled inductor, and the magnetic core 20 includes a first magnetic core 21, a second magnetic core 22 and six pairs of magnetic core pillars 23. Six windings 10 are arranged in an annular array. Each of the first magnetic core 21 and the second magnetic core 22 include a connecting portion in the middle and six branches extending outward from the connecting portion. The six branches of the first magnetic core 21 and the six branches of the second magnetic core 22 are connected correspondingly through the magnetic core pillars 23 on a one-to-one basis. Each of the ends of the six branches of the first magnetic core 21 and the six branches of the second magnetic core 22 are provided with a protruding structure as the magnetic core pillar 23, and the upper part in which the first magnetic core 21 and the six magnetic core pillars 23 located at the ends thereof are integrally formed has the same shape as the lower part in which the second magnetic core 22 and the six magnetic core pillars 23 located at the ends thereof are formed integrally.

Figure 21:
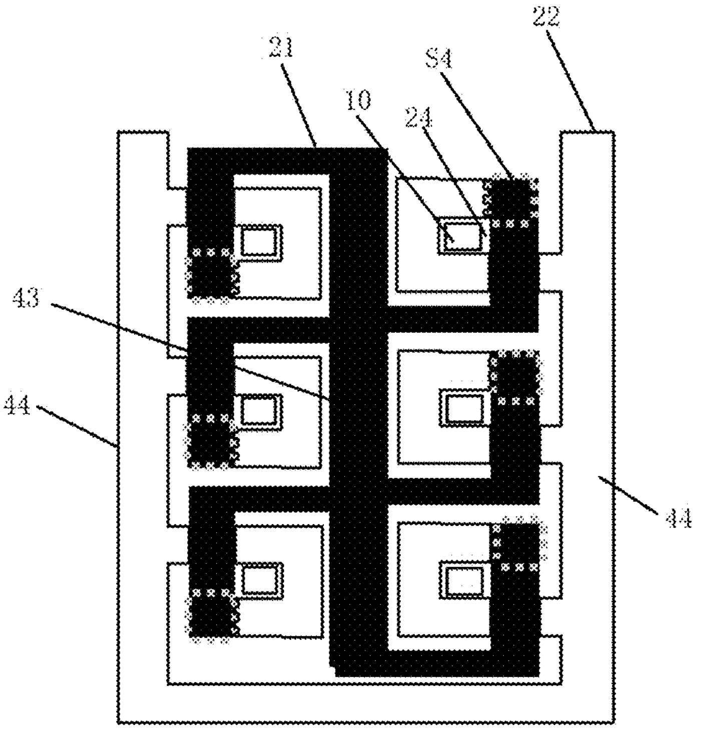
FIG. 21 is a schematic structural diagram of a multi-phase reverse coupled inductor according to an eleventh exemplary embodiment.

In an embodiment, as shown in FIG. 21, the multi-phase coupled inductor is a six-phase coupled inductor, and the six windings 10 are arranged in a 2×3 array. The first magnetic core 21 includes a linear columnar first connecting portion 43 and six branches extending outward from the first connecting portion 43, of which three branches extend to a left side of the first connecting portion 43, and the other three branches extend to a right side of the first connecting portion 43. The second magnetic core 22 includes a U-shaped second connecting portion 44 and six branches extending inward from the second connecting portion 44. The six branches of the first magnetic core 21 and the six branches of the second magnetic core 22 are connected correspondingly through the magnetic core pillars 23 on a one-to-one basis, and the first magnetic core 21, the second magnetic core 22 and the magnetic core pillars 23 form six magnetic core units which surround the six windings 10 on a one-to-one basis.

Figure 22:
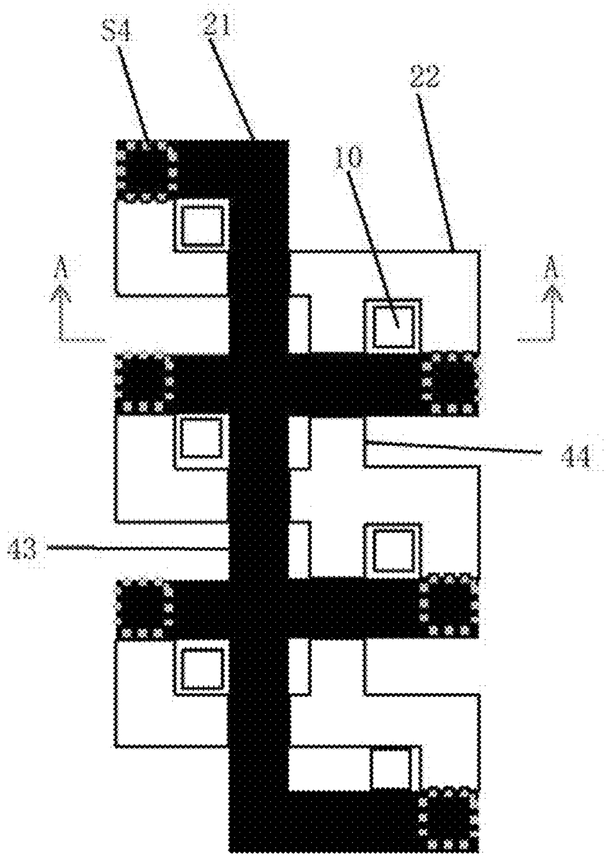
FIG. 22 is a schematic structural diagram of a multi-phase reverse coupled inductor according to a twelfth exemplary embodiment.
Figure 23:
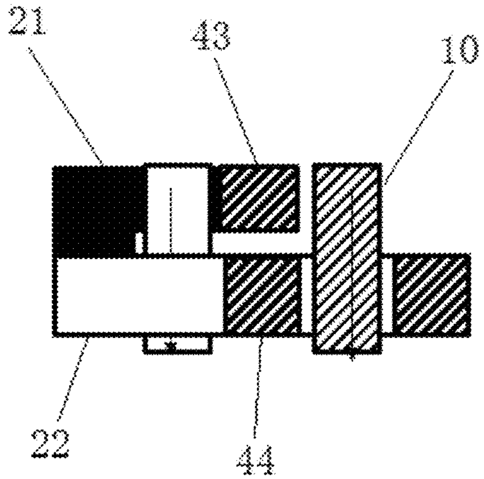
FIG. 23 is a schematic diagram of a cross-sectional structure at A-A in FIG. 22.

In an embodiment, as shown in FIGS. 22 and 23, the coupled inductor in FIG. 22 has a similar structure to that shown in FIG. 21, and is also the six-phase coupled inductor. The main difference thereof lies in the structure of the second magnetic core 22. In FIG. 22, the second magnetic core 22 includes a linear columnar second connecting portion 44 and six branches extending outward from the second connecting portion 44, of which three branches extend to the left side of the second connecting portion 44, and the other three branches extend to the right side of the second connecting portion 44. The six branches of the first magnetic core 21 and the six branches of the second magnetic core 22 are connected correspondingly through the magnetic core pillars 23 on a one-to-one basis. The first magnetic core 21, the second magnetic core 22 and the magnetic core pillars form six magnetic core units which surround the six windings 10 on a one-to-one basis. Such a connection manner makes the lengths for connecting magnetic pillars shorter, which is more conducive to reducing the magnetic core loss. The direction of the current flowing through each winding 10 can be from top to bottom, and the windings 10 may be reversely coupled. In FIG. 22, for the convenience of illustration, the first connecting portion 43 and the second connecting portion 44 are drawn staggered.

Figure 24:
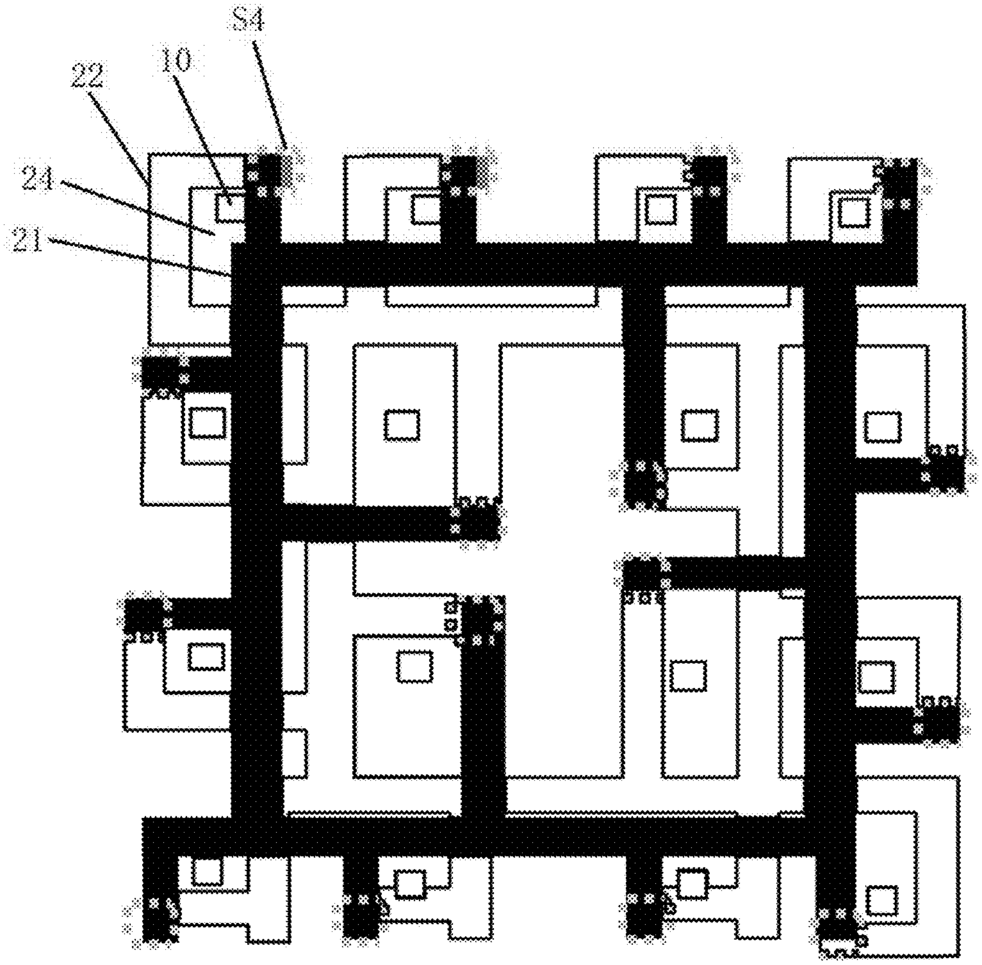
FIG. 24 is a schematic structural diagram of a multi-phase reverse coupled inductor according to a thirteenth exemplary embodiment.

In an embodiment, as shown in FIG. 24, the coupled inductor is a sixteen-phase coupled inductor, and sixteen windings 10 are arranged in a 4×4 array. In the sixteen-phase coupled inductor, each of the first magnetic core 21 and the second magnetic core 22 includes a □-shaped connecting portion and sixteen branches extending from the connecting portion, where "□" is a Chinese character as a square loop or a rectangle loop. The sixteenth branches of the first magnetic core 21 and the sixteen branches of the second magnetic core 22 are connected correspondingly through the magnetic core pillars 23 on a one-to-one basis. In some other embodiments, the number and array arrangement of the windings 10 may be in other forms.

Figure 25:
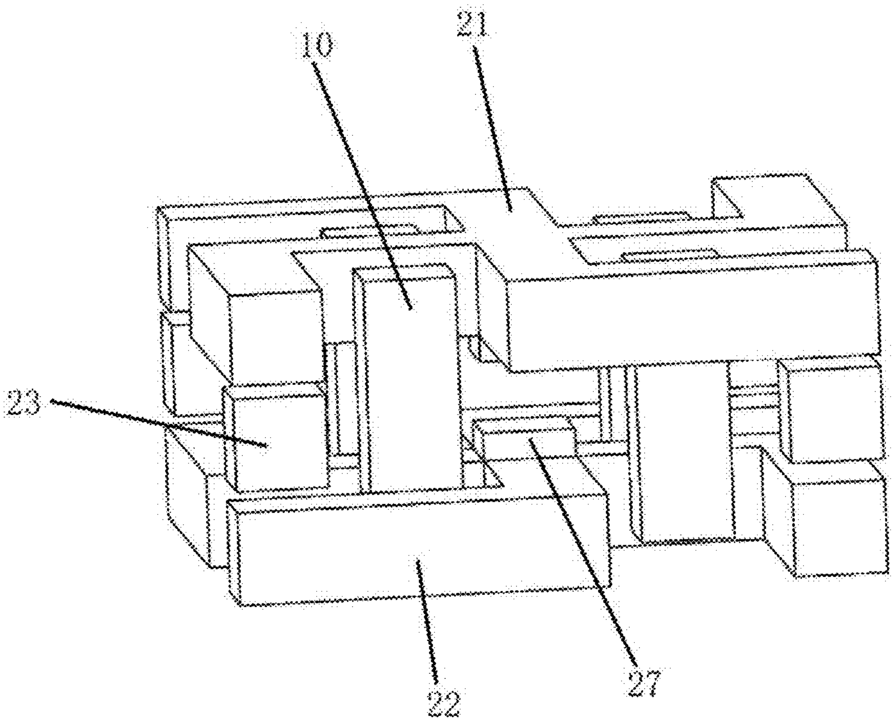
FIG. 25 is a schematic structural diagram of a multi-phase coupled inductor in a first perspective of view according to a fourteenth exemplary embodiment.
Figure 26:
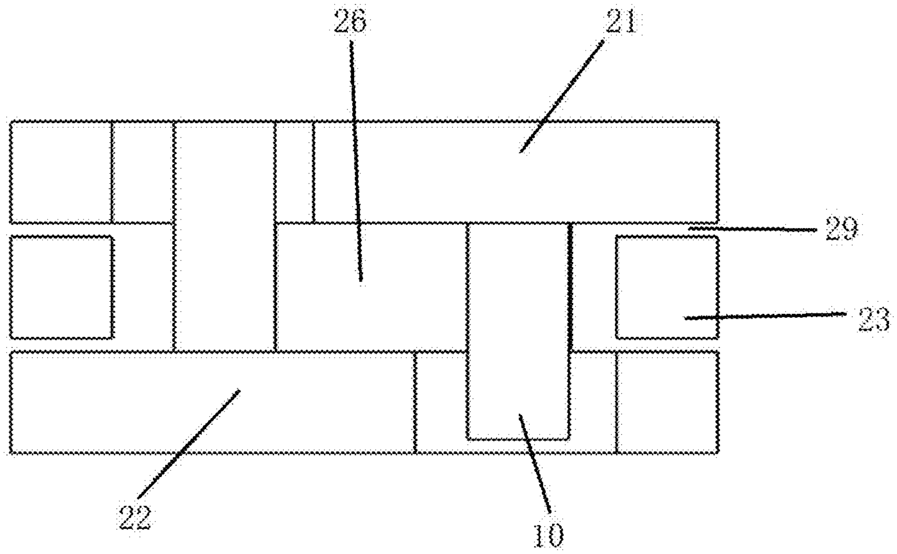
FIG. 26 is a schematic structural diagram of a multi-phase coupled inductor in a second perspective of view according to the fourteenth exemplary embodiment.
Figure 27:
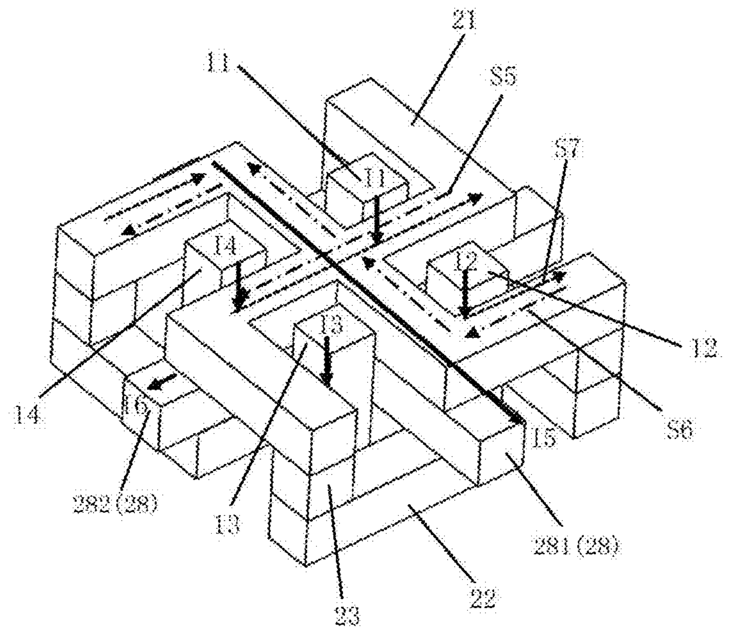
FIG. 27 is a schematic structural diagram of a multi-phase reverse coupled inductor according to a fifteenth exemplary embodiment.

In some embodiments, as shown in FIGS. 25-27, a gap region 26 between the first magnetic core 21 and the second magnetic core 22 may be provided with at least one of a decoupling magnetic pillar 27, a diamagnetic material, a transition magnetic material, an electronic device and a horizontal winding 28.

As shown in FIGS. 25 and 26, the decoupling magnetic pillar 27 can be provided in the gap region 26, and can be used to adjust the coupling strength between the inductors of the phases. In some other embodiments, the diamagnetic material with a relative permeability of less than 1 can be provided in the gap region 26, such as zinc, copper or the like. The diamagnetic material can improve the coupling strength between the inductors of the phases. It is also possible to provide the transition magnetic material that is easily magnetically saturated in the gap region 26, such as a ferrite material or the like. When the currents in the windings 10 are small, the windings of the respective phases are not coupled, and when the currents in the windings 10 are great, for example, greater than a preset value, the transition magnetic material may form an air gap due to the saturation, and the coupling between the windings of the respective phases begins. Other electronic devices can also be provided in the gap region 26 to improve the space utilization of the coupled inductor. By adjusting a height of the gap region 26, a coupling coefficient of the inductor can be changed to improve the adaptability of the inductor. Air gaps 29 are provided between the first magnetic core 21 and the magnetic core pillars 23, and provided between the second magnetic core 22 and the magnetic core pillars 23. Specifically, the air gaps 29 are provided between the first magnetic core 21 and the magnetic core pillars 23, and between the second magnetic core 22 and the magnetic core pillars 23, and can adjust the inductance and saturation current of the inductor of each phase. In summary, different materials or gaps can be provided between the first magnetic core 21 and the second magnetic core 22 to flexibly adjust the characteristics of the coupled inductor and improve the space utilization of the coupled inductor.

In an embodiment, as shown in FIG. 27, two horizontal windings 28 may be provided in the gap region 26 between the first magnetic core 21 and the second magnetic core 22, which includes a first horizontal windings 281 and a second horizontal winding 282. The four windings 10 include a first winding 11, a second winding 12, a third winding 13, and a fourth winding 14. The first horizontal winding 281 extends laterally between the first magnetic core 21 and the second magnetic core 22, the second horizontal winding 282 extends longitudinally between the first magnetic core 21 and the second magnetic core 22, and the two horizontal windings 28 are arranged perpendicular to the windings 10 extending in the vertical direction. The reverse coupling or positive coupling can be achieved between the horizontal winding 28 and the windings 10, which in turn can affect the coupling between the windings 10. For example, in the embodiment, the directions of the current I1 flowing through the first winding 11, the current I2 flowing through the second winding 12, the current I3 flowing through the third winding 13, and the current I4 flowing through the fourth winding 14 are all from top to bottom. The direction of a current I5 flowing through the first horizontal winding 281 is from back to front, and the direction of a current I6 flowing through the second horizontal winding 282 is from right to left. The magnetic flux generated by the currents I1 and I2 is in a direction opposite to that of the magnetic flux generated by the current I5, and the first winding 11, the second winding 12 and the first horizontal winding 281 are reversely coupled to each other. Specifically, the magnetic flux generated by the current I1 is indicated by the dotted line S5, the magnetic flux generated by the current I2 is indicated by the dotted line S6, and the magnetic flux generated by the current I5 is indicated by the dotted line S7. The magnetic flux S5 and the magnetic flux S6 both have a direction opposite to that of the magnetic flux S7. The magnetic flux generated by the current I3 and the current I4 has the same direction as that of the magnetic flux generated by the current I5, and the third winding 13 and the fourth winding 14 are positively coupled with the first horizontal winding 281. Similarly, the second winding 12 and the third winding 13 may be positively coupled with the second horizontal winding 282, and the first winding 11 and the fourth winding 14 may be reversely coupled with the second horizontal winding 282, for example, as indicated by the direction of the current I6 shown in the figure. In other embodiments, magnitudes and directions of the currents I5 and I6 in the horizontal windings 28 can be in other forms, and the coupling relationship between the horizontal winding 28 and the windings 10 may be changed accordingly, thereby affecting the coupling relationship between the windings 10. The horizontal windings 28 may be arranged in a circuit board. For example, the circuit board may be arranged between the first magnetic core 21 and the second magnetic core 22, and conductive lines may be arranged in the circuit board to form the two horizontal windings 28 that are vertically arranged.

Figure 28:
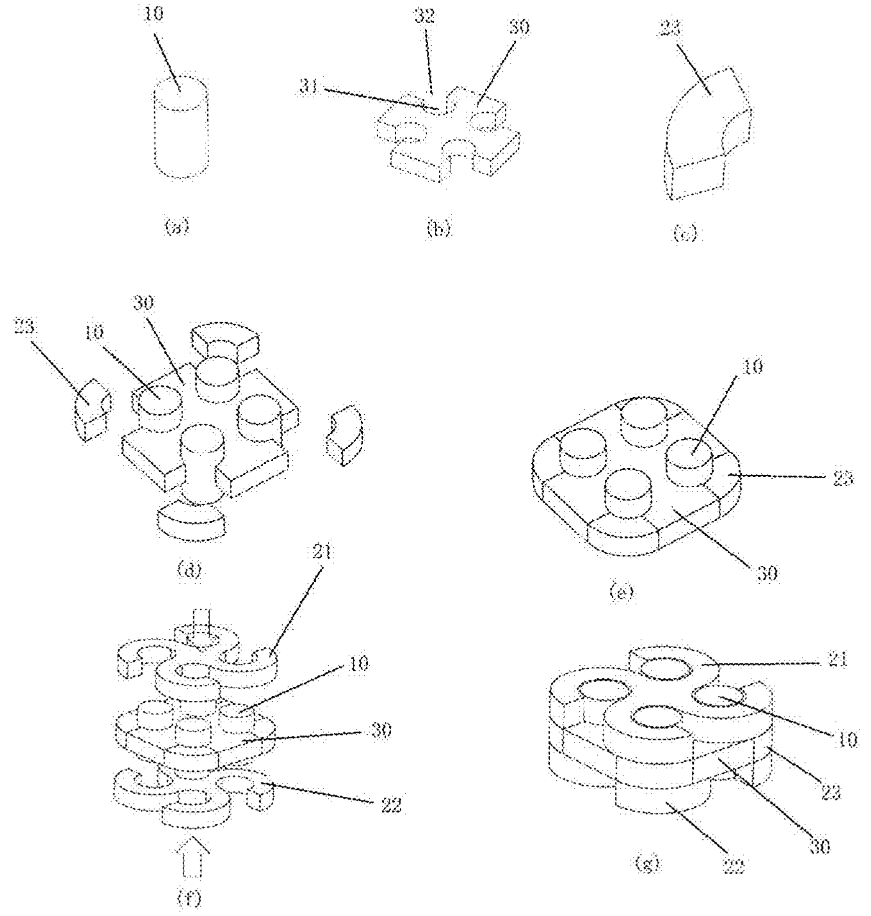
FIG. 28 is a schematic flowchart of a first embodiment of a manufacturing method of a multi-phase coupled inductor.
Figure 30:
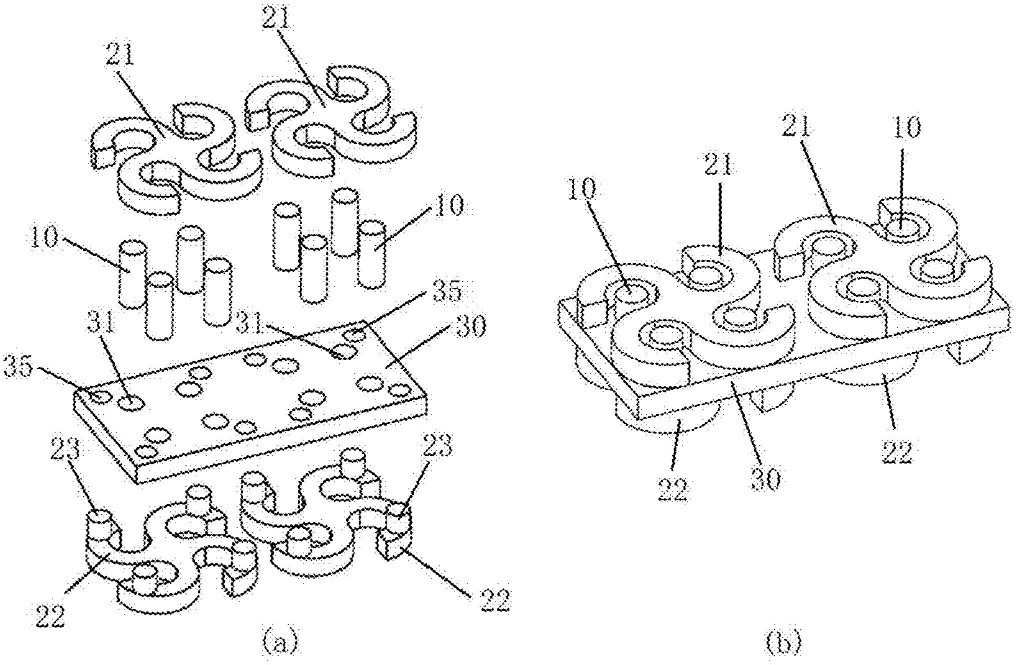
FIG. 30 is a schematic diagram of a third embodiment of the manufacturing method of the multi-phase coupled inductor.

In some embodiments, the multi-phase coupled inductor further includes an isolation plate 30, which is disposed between the first magnetic core 21 and the second magnetic core 22, and the at least three windings 10 pass through the isolation plate 30. The isolation plate 30 may be made of a non-magnetic material, such as PCB or organic resin. The isolation plate 30 can be used to fix the windings 10 for the ease of assembling. The isolation plate 30 is provided with first mounting holes 31 and second mounting holes, the windings 10 pass through the first mounting holes 31, and at least parts of the magnetic core pillars 23 are disposed in the second mounting holes. As shown in FIG. 28, the second mounting holes may be notches 32 which communicate with the first mounting holes 31. As shown in FIG. 30, the second mounting holes may be through holes 35. The through holes 35 are separated from the first mounting holes 31, and the through holes 35 and the first mounting holes 31 are located within the isolation plate 30. The first mounting holes 31 and the second mounting holes are used to fix the windings 10 and the magnetic core pillars 23, respectively, to improve the assembling efficiency of the multi-phase coupled inductor.

In the multi-phase coupled inductor of the embodiment of the present disclosure, at least three windings are arranged in an array, at least three magnetic core units of the magnetic core surround the corresponding windings in the same direction, so that the multi-phase inverse coupling can be realized in which the coupling strength between the inductors of the multiple phases and the amount of the inductance thereof are well balanced and consistent, and the at least three windings may include linear windings, which is of a simple and compact structure.

According to a second aspect of the present disclosure a manufacturing method of a multi-phase coupled inductor is provided for manufacturing the multi-phase coupled inductor described in the above embodiments. As shown in FIGS. 28-32, the manufacturing method of the multi-phase coupled inductor includes: providing windings 10 including at least three windings 10, wherein the at least three windings 10 are arranged in an array between a first plane and a second plane and include linear winding portions between the first plane and the second plane and, and the first plane and the second plane are parallel to each other; and providing a magnetic core 20 which includes a first magnetic core 21, a second magnetic core 22 and at least three magnetic core pillar 23*s*, wherein the first magnetic core 21 and the second magnetic core 22 are respectively located al two ends of the windings 10, the magnetic core pillars 23 are connected with the first magnetic core 21 and the second magnetic core 22, the first magnetic core 21, the second magnetic core 22, and the magnetic core pillars 23 form at least three magnetic core units, the magnetic core units and the windings 10 are arranged correspondingly on a one-to-one basis, the at least three magnetic core units surround the corresponding windings 10 and extend from the first plane to the second plane in a same direction, and projections of the at least three magnetic core units on the first plane perpendicular to the windings 10 form at least three enclosed areas 24 which correspond to the windings 10 on a one-to-one basis.

In some embodiments, the manufacturing method of the multi-phase coupled inductor further includes providing an isolation plate 30 through which the at least three windings 10 pass; arranging at least parts of the magnetic core pillars 23 on the isolation plate 30 to correspond to the windings 10 on a one-to-one basis; and mounting the first magnetic core 21 and the second magnetic core 22 on two sides of the isolation plate 30, respectively.

As shown in FIG. 28, in step 1, the windings 10 are prefabricated, as shown in FIG. 28(*a*), the isolation plate 30 is prefabricated, as shown in FIG. 28(*b*), and the magnetic core pillars 23 are prefabricated, as shown in FIG. 28(*c*). In step 2, the windings 10, the isolation plate 30 and the magnetic core pillars 23 are pre-assembled. FIG. 28(*d*) illustrates a pre-assembling process of the windings 10, the isolation plate 30 and the magnetic core pillars 23, and FIG. 28(*e*) illustrates the assembled assembly. In step 3, the first magnetic core 21 and the second magnetic core 22 are assembled with the assembled assembly shown in FIG. 28(*e*). FIG. 28(*f*) illustrates a process of assembling the first magnetic core 21 and the second magnetic core 22 into the assembly, and FIG. 28(*g*) illustrates the assembled multi-phase coupled inductor. The first magnetic core 21, the second magnetic core 22 and the magnetic core pillars 23 may all be made of ferrite materials.

Figure 29:
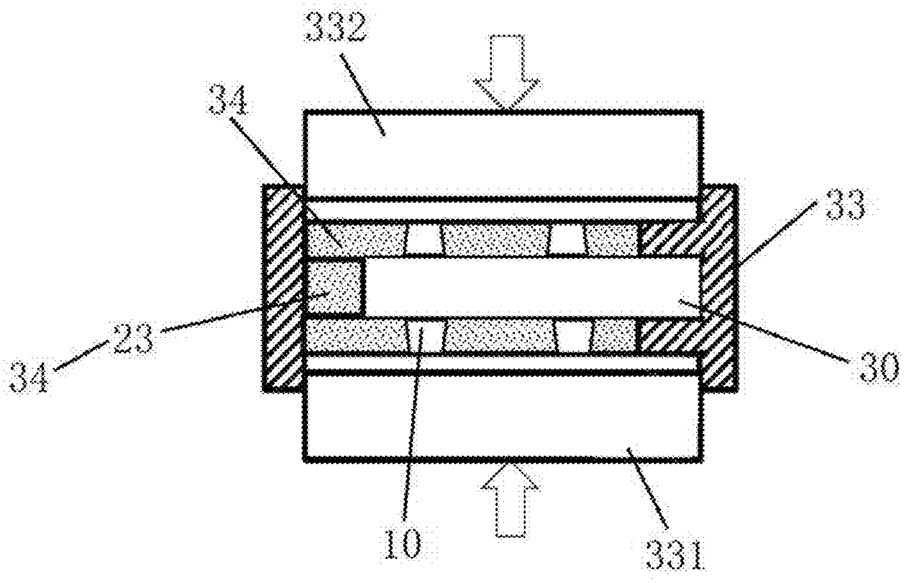
FIG. 29 is a schematic diagram of a second embodiment of the manufacturing method of the multi-phase coupled inductor.

In some embodiments, powder core materials 34 may be used for the first magnetic core 21 and the second magnetic core 22. For example, in step 3, the assembly pre-assembled in step 2 is placed in a mold body 33 as shown in FIG. 29, and the isolation plate 30 is fixed on the mold body 33, the powder core materials 34 are filled on the upper and lower sides of the isolation plate 30, respectively, to seal the isolation plate 30 in the powder core materials 34. Then, the powder core material 34 are pressed integrally with the isolation plate 30 and the magnetic core pillar 23 as a whole by pressing down the powder core materials 34 by an upper punch 332 and pressing up the powder core materials 34 by a lower punch 331. The powder core materials 34 form the first magnetic core 21 and the second magnetic core 22, and the magnetic core pillars 23 can be made of the ferrite materials or the powder core materials. Heating can also be performed during the molding process to facilitate flow and combination of the powder core materials.

In some embodiments, the magnetic core pillars 23 may not be prefabricated in step 1, and can be formed by the powder core materials 34 in step 3. For example, in step 3, the powder core materials 34 can be filled in the mold body 33 to seal the isolation plate 30 in the powder core materials 34. Then, the powder core materials 34 are punched by the upper punch 332 and the lower punch 331 to press the powder core materials 34 and the isolation plate 30 into a whole. The powder core materials 34 form the entire magnetic core 20, that is, the first magnetic core 21, the second magnetic core 22 and the magnetic core pillars 23 are all punched from the powder core materials 34. Assembling the prefabricated magnetic core pillars 23 and the isolation plate 30 in advance is more conducive to the filling of the powder core materials 34 and reducing force on the winding 10 and displacement of the windings 10 during the molding process, and is conducive to improving the manufacture precision and yield of the inductor. If the powder core materials 34 are used for molding and forming the entire magnetic core 20, the resulting inductor structure may be more compact, with simple manufacturing process and low cost.

In an embodiment, the multi-phase coupled inductors may also be fabricated in a panel manner to further improve the production efficiency of the inductors and reduce the manufacture cost of the inductor. FIG. 30(*a*) illustrates the assembling process of the multi-phase coupled inductors, and FIG. 30(*b*) illustrates the assembled multi-phase coupled inductors. The multi-phase coupled inductors include two four-phase coupled inductors, and the windings in each four-phase coupled inductor are arranged in a 2×2 array. As shown in FIG. 30(*a*), a panel isolation plate 30 is formed, first mounting holes 31 are formed on the isolation plate 30 for installing the windings 10, and through holes 35 are formed on the isolation plate 30 for installing the magnetic core pillars 23. The multi-phase coupled inductor panel shown in FIG. 30(*b*) can be fabricated by using the process shown in FIG. 28 or FIG. 29. Finally, the isolation plate 30 can be cut between the two multi-phase coupled inductors to form two independent multi-phase coupled inductors. FIG. 30(*b*) shows that the two four-phase coupled inductors integrated into the same isolation board 30 can also be used as a final product. For example, the isolation board 30 is a Printed Circuit Board (PCB), on which other electronic devices such as power devices, capacitors or resistors can be provided to form a module structure with certain functions.

Figure 31:
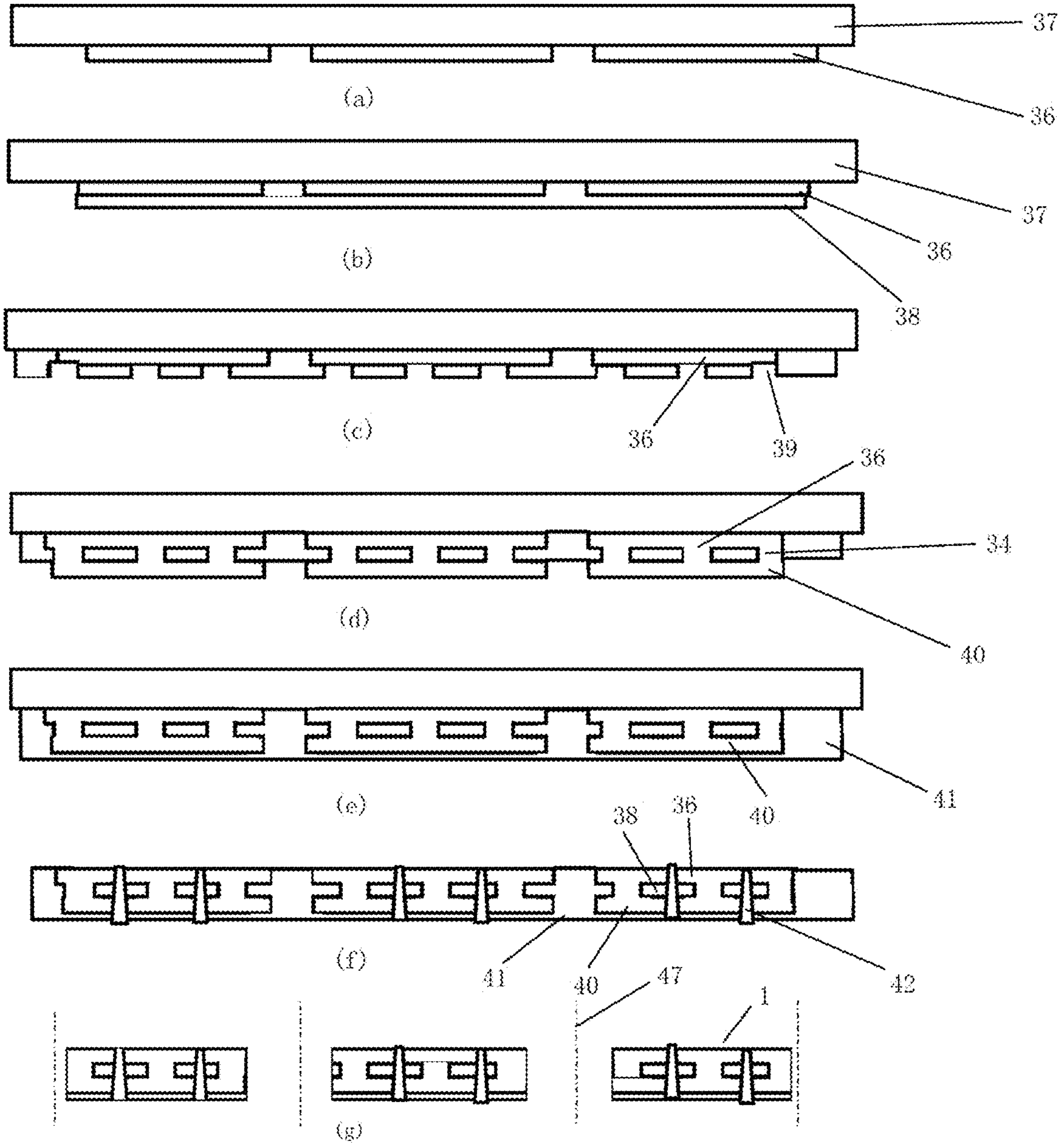
FIG. 31 is a schematic flow t a fourth embodiment of the manufacturing method of the multi-phase coupled inductor.
Figure 32:
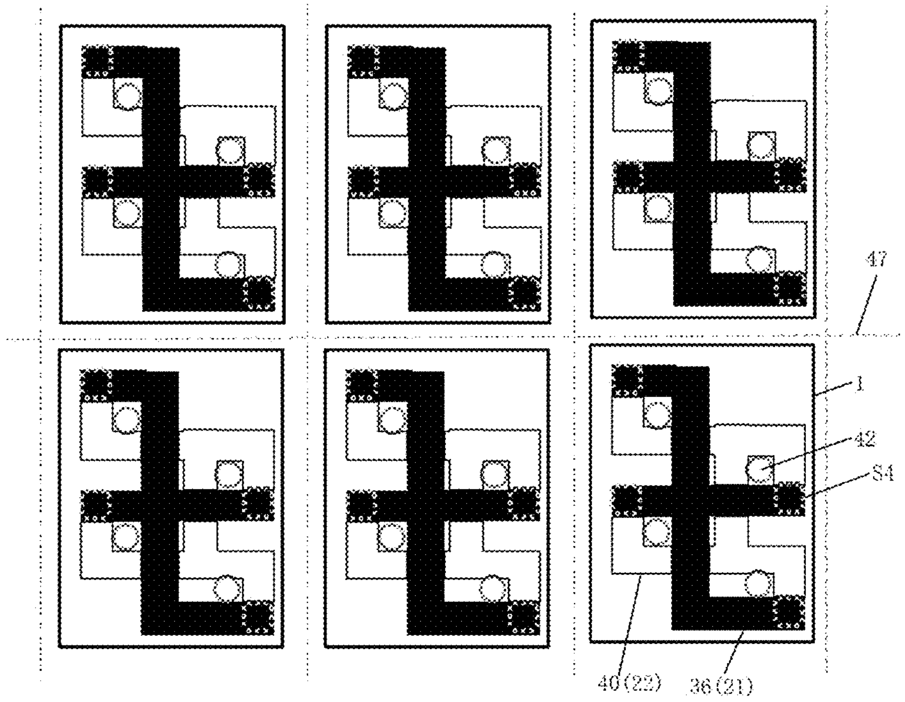
FIG. 32 is a schematic structural diagram of a multi-phase coupled inductor obtained from the fourth embodiment of the manufacturing method of the multi-phase coupled inductor.

In an embodiment, as shown in FIGS. 31 to 32, in step 1, a first magnetic core layer 36 is provided on a workbench 37, as shown in FIG. 31(*a*). The first magnetic core layer 36 can be implemented in various ways, for example, the first magnetic core layer 36 can be made of a prefabricated magnetic core plate or magnetic core film, can be formed by printing on the workbench 37, or can be formed by sputtering. In step 2, as shown in FIG. 31(*h*), a first isolation layer 38 is arranged on the first magnetic core layer 36. The first isolation layer 38 can be formed by splashing or printing, or can be formed from the prefabricated isolation plate. The first isolation layer 38 may be made of non-magnetic materials, such as a resin material, or a molding insulating packaging material, or may be a Printed Circuit Board (PCB) so that conductive lines can be formed in the first isolation layer 38. Since the first magnetic core layer 36 has gaps, the first isolation layer 38 can be laid not only on the first magnetic core layer 36, but also part of the first isolation layer 38 can be laid on the workbench 37. In step 3, as shown in FIG. 31(*c*), the filling holes 39 are formed on the first isolation layer 38 to expose part of first magnetic core layer 36. The filling holes 39 can be formed by laser irradiation, or can be formed while arranging the first isolation layer 38 in step 2, and the filling holes 39 can be through-holes. In step 4, as shown in FIG. 31(*d*), the powder core materials 34 are filled in the filling holes 39, and a second magnetic core layer 40 is arranged on a distal side of the first isolation layer 38 away from the first magnetic core layer 36. The second magnetic core layer 40 may be fabricated in the same way as the first magnetic core layer 36. In step 5, as shown in FIG. 31(*e*), a second isolation layer 41 is arranged on the distal side of the first isolation layer 38 away from the first magnetic core layer 36 to fill the gaps of the second magnetic core layer 40. The powder core materials 34 are covered by the second isolation layer 41. In step 6, as shown in FIG. 31(*f*), conductive vias 42 are formed through the second isolation layer 41, the second magnetic core layer 40, the first isolation layer 38 and the first magnetic core layer 36. The conductive vias 42 form the windings 10, the first magnetic core layer 36 forms the first magnetic core 21, the second magnetic core layer 40 forms the second magnetic core 22, and the powder core materials 34 form the magnetic core pillars 23. The projections of the filling holes 39 on the first plane cover at most part of the projections of the conductive vias 42 on the first plane. The vertical conductive vias 42 may be exposed on the upper and lower surfaces of the multi-phase coupled inductor, and may be fabricated in a manner similar to that of forming the conductive vias in the punted circuit board. For example, the through-holes may be machined first, and then electroplating can be performed in the through-holes, or the conductive material can be filled in the through-holes. In step 7, as shown in FIG. 31(*g*) and FIG. 32, cutting is performed along a cutting line 47 to finally form multi-phase coupled inductors 1 separated from each other, and the projections of the conductive vias 42 on the first plane are surrounded by the projection of the magnetic core on the first plane, forming the multi-phase reverse coupled inductors as described in the above embodiments. For the convenience of illustration, the first magnetic core layer 36 and the second magnetic core layer 40 are drawn in a staggered manner. In some other embodiments, step 5 can be omitted, that is, it is not necessary to provide the second isolation layer 41.

Figure 33:
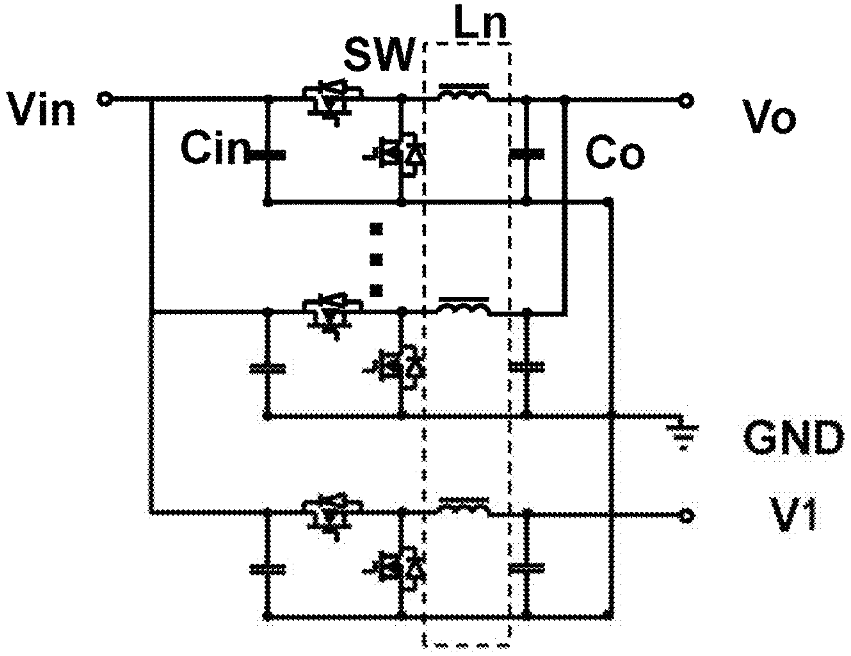
FIG. 33 is a schematic diagram of a multi-phase Buck circuit.
Figure 34:
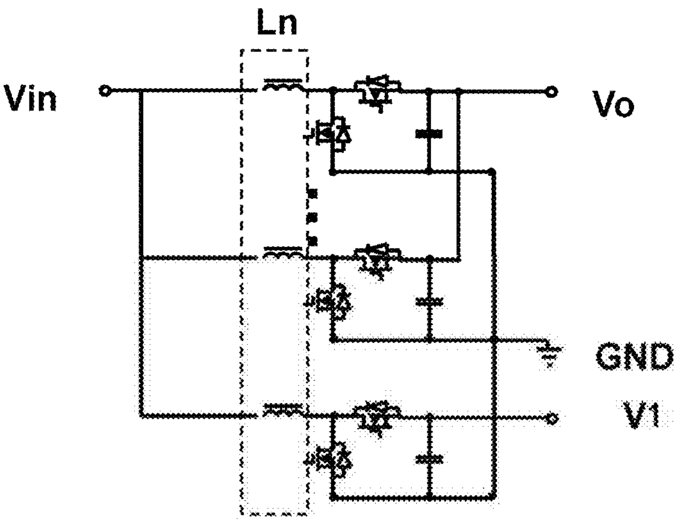
FIG. 34 is a schematic diagram of a multi-phase Boost circuit.
Figure 35:
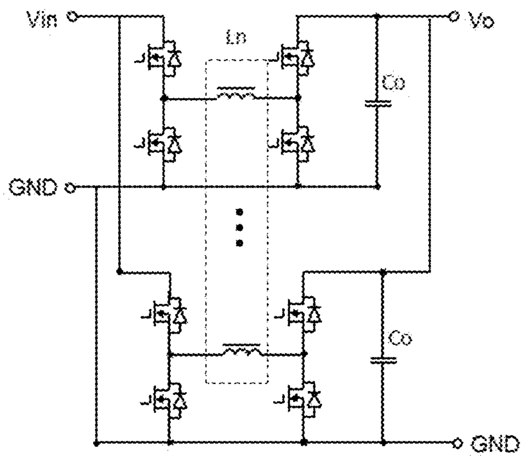
FIG. 35 is a schematic diagram of a multi-phase four-switch Buck-Boost circuit.
Figure 36:
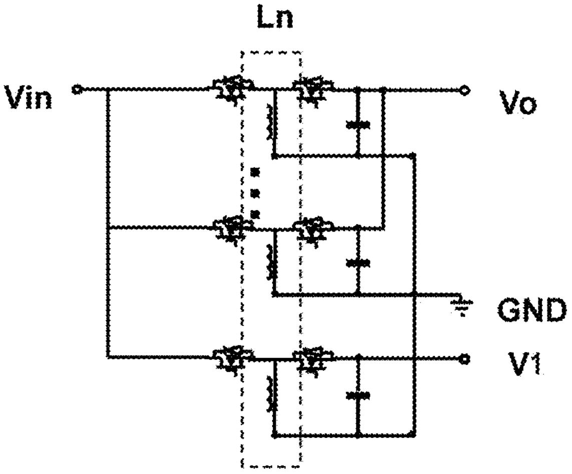
FIG. 36 is a schematic diagram of a multi-phase buck-boost circuit.

FIGS. 33 to 36 show applications of the multi-phase coupled inductor in some circuits, and the multi-phase coupled inductor may adopt the structure described in the above embodiments. FIG. 33 shows a Buck circuit (buck converter circuit), FIG. 34 shows a Boost circuit (boost converter circuit), FIG. 35 shows a multi-phase parallel four-switch Buck-Boost circuit, and FIG. 36 illustrates a Buck-Boost circuit (buck-boost converter circuit), wherein Ln represents a multi-phase coupled inductor, Cin represents an input capacitor, Co represents an output capacitor. Vin represents a positive input of a half-bridge circuit, GND represents a negative input of the half-bridge circuit, Vo represents a positive output of the half-bridge circuit, SW represents a midpoint of the half-bridge circuit, and V1 represents a negative output of the half-bridge circuit which has a different output voltage from Vo. It is to be noted that the multi-phase coupled inductor of the present disclosure is not limited to being applied to these circuits, and can also be used in other circuit topologies, such as Cuk circuits, flyback circuits, switch capacitor circuits, LLC circuits, or the like.

Those skilled in the art will easily think of other embodiments of the present disclosure after considering the description and practicing the disclosure disclosed herein. The present disclosure is intended to cover any variations, uses, or adaptive changes of the present disclosure which follow the general principles of the present disclosure and include common knowledge or conventional technical means in the art not disclosed in the present disclosure. The description and the exemplary embodiments are considered as exemplary only, and a true scope and spirit of the present disclosure are indicated by the appended claims.

It should be understood that the present disclosure is not limited to the precise structures that have been described above and shown in the drawings, and various modifications and changes can be made without departing from the scope thereof. The scope of the present disclosure is defined only by the appended claims.

What is claimed is:

1. A multi-phase coupled inductor, comprising:

at least three windings arranged in an array between a first plane and a second plane, wherein the windings (10) comprise linear winding portions between the first plane and the second plane, and the first plane and the second plane are parallel to each other; and a magnetic core (20) comprising a first magnetic core (21), a second magnetic core (22), and at least three magnetic core pillars (23), wherein the first magnetic core (21) and the second magnetic core (22) are respectively located at two ends of the windings (10), the magnetic core pillars (23) are connected with the first magnetic core (21) and the second magnetic core (22), the magnetic core pillars (23), the first magnetic core (21), and the second magnetic core (22) form at least three magnetic core units, the magnetic core units and the windings (10) are arranged correspondingly on a one-to-one basis, and the at least three magnetic core units surround the corresponding windings (10) and extend from the first plane to the second plane in a same direction;

wherein projections of the at least three magnetic core units on the first plane perpendicular to the windings (10) form at least three enclosed areas (24) corresponding to the windings (10) on a one-to-one basis.

2. The multi-phase coupled inductor according to claim 1, wherein the first magnetic core (21) comprises at least three first connecting ends (211), the second magnetic core (22) comprises at least three second connecting ends (221), and the magnetic core pillars (23) are respectively connected between the corresponding first connecting ends (211) and second connecting ends (221).

3. The multi-phase coupled inductor according to claim 1, wherein at least one of the first magnetic core (21) and the second magnetic core (22) is formed integrally with the magnetic core pillars (23), or the first magnetic core (21), the second magnetic core (22) and the magnetic core pillars (23) are formed separately.

4. The multi-phase coupled inductor according to claim 1, wherein:

the windings (10) comprise three windings (10) arranged in an equilateral triangle array or a right-angled triangle array, or the windings (10) comprise at least four windings (10) arranged in an annular array or rectangular array.

5. The multi-phase coupled inductor according to claim 1, wherein the windings (10) have a polygonal prism shape or a cylindrical shape.

6. The multi-phase coupled inductor of claim 1, further comprising a conductive plate (25) connected with the windings (10).

7. The multi-phase coupled inductor according to claim 1, wherein a gap area (26) is formed between the first magnetic core (21) and the second magnetic core (22), and the multi-phase coupled inductor further comprises at least one of a decoupling magnetic pillar (27), a diamagnetic material, a transition magnetic material, an electronic device, and a horizontal winding (28) disposed in the gap area (26).

8. The multi-phase coupled inductor according to claim 1, wherein the magnetic core pillars (23) between the first magnetic core (21) and the second magnetic core (22) are provided with air gaps (29).

9. The multi-phase coupled inductor of claim 1, further comprising:

an isolation plate (30) arranged between the first magnetic core (21) and the second magnetic core (22), wherein the at least three windings (10) pass through the isolation board (30).

10. The multi-phase coupled inductor according to claim 9, wherein first mounting holes (31) and second mounting holes are provided on the isolation plate (30), the windings (10) pass through the first mounting holes (31), and at least parts of the magnetic core pillars (23) are arranged in the second mounting holes, and wherein the second mounting holes are notches (32) which communicate with the first mounting holes (31), or the second mounting holes are through holes (35) which are isolated from the first mounting holes (31), and the through holes (35) and the first mounting holes (31) are located in the isolation plate (30).

11. The multi-phase coupled inductor according to claim 1, wherein the first magnetic core (21) and the second magnetic core (22) have a same shape.

12. The multi-phase coupled inductor according to claim 1, wherein the magnetic core pillars (23) are arranged in pairs, and two magnetic core pillars (23) in the pair are arranged on the first magnetic core (21) and the second magnetic core (22), respectively.

13. The multi-phase coupled inductor according to claim 12, wherein one of the two magnetic core pillars (23) in the pair is formed integrally with the first magnetic core (21), and the other one of the two magnetic core pillars (23) in the pair is formed integrally with the second magnetic core (22), and wherein the first magnetic core (21) and the second magnetic core (22) have a same shape, and the two magnetic core pillars (23) in the pair have a same shape.

14. The multi-phase coupled inductor according to claim 1, wherein currents flowing through the at least three windings (10) are in a same direction, and magnetic flux generated by the current flowing through any one of the windings (10) in the corresponding magnetic core unit is in a direction opposite to the direction of the magnetic flux generated by the current flowing through any other of the windings (10) in the magnetic core unit.

* * * * *